(12) United States Patent
Liu

(10) Patent No.: US 11,914,579 B2
(45) Date of Patent: Feb. 27, 2024

(54) BLOCKCHAIN-BASED DATA PROCESSING METHOD AND APPARATUS, DEVICE, AND READABLE STORAGE MEDIUM

(71) Applicant: Tencent Technology (Shenzhen) Company Limited, Shenzhen (CN)

(72) Inventor: Pan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 135 days.

(21) Appl. No.: 17/730,044

(22) Filed: Apr. 26, 2022

(65) Prior Publication Data

US 2022/0253432 A1 Aug. 11, 2022

Related U.S. Application Data

(63) Continuation of application No. PCT/CN2021/088899, filed on Apr. 22, 2021.

(30) Foreign Application Priority Data

May 27, 2020 (CN) .......................... 202010458171.4

(51) Int. Cl.
  *G06F 16/23* (2019.01)
  *G06F 16/27* (2019.01)

(52) U.S. Cl.
  CPC .......... *G06F 16/2379* (2019.01); *G06F 16/27* (2019.01)

(58) Field of Classification Search
  CPC ...... G06F 16/2379; G06F 16/27; G06F 21/64; G06F 16/1834; H04L 9/3236; H04L 9/50; G06Q 20/389
  See application file for complete search history.

(56) References Cited

U.S. PATENT DOCUMENTS

2016/0189025 A1* 6/2016 Hayes ................. G06Q 10/101
  706/29
2019/0253239 A1 8/2019 Shao et al.
  (Continued)

FOREIGN PATENT DOCUMENTS

CN 108776929 A 11/2018
CN 108848055 A 11/2018
  (Continued)

OTHER PUBLICATIONS

Tencent Technology, ISR, PCT/CN2021/088899, dated Jul. 21, 2021, 2 pgs.
  (Continued)

*Primary Examiner* — Cam Y T Truong
(74) *Attorney, Agent, or Firm* — Morgan, Lewis & Bockius LLP

(57) ABSTRACT

A computing device transmits, to a second node, first consensus voting information for a target block. The device receives, from the second node, second consensus voting information for the target block. The device determines a consensus result for the target block according to the first and second consensus voting information. In accordance with a determination that the consensus result is a consensus success result, the device activates an accounting duration window. The device performs accounting processing on the target block in the predetermined time duration of the accounting duration window. The device receives, from the second node, a first accounting completion message for the target block transmitted by the second node in the accounting duration window. In accordance with a determination that accounting processing on the target block is completed in the accounting duration window, the device transmits a second accounting completion message to the second node.

19 Claims, 9 Drawing Sheets

(56) References Cited

U.S. PATENT DOCUMENTS

| | | | |
|---|---|---|---|
| 2019/0279107 A1 | 9/2019 | Wang et al. | |
| 2019/0340170 A1 | 11/2019 | Pierce et al. | |
| 2020/0273003 A1* | 8/2020 | Swami | G06Q 20/102 |
| 2020/0364212 A1* | 11/2020 | Cho | H04L 12/46 |

FOREIGN PATENT DOCUMENTS

| | | |
|---|---|---|
| CN | 109274717 A | 1/2019 |
| CN | 109544310 A | 3/2019 |
| CN | 109903155 A | 6/2019 |
| CN | 110505091 A | 11/2019 |
| CN | 110535836 A | 12/2019 |
| CN | 111061769 A | 4/2020 |
| CN | 111368008 A | 7/2020 |
| EP | 3457623 A1 | 3/2019 |
| JP | 2019012510 A | 1/2019 |
| JP | 2020501402 A | 1/2020 |

OTHER PUBLICATIONS

Tencent Technology, Indian Office Action, IN Application No. 202247022724, dated Sep. 21, 2023, 7 pgs.
Tencent Technology (Shenzhen) Company Limited, JP2022539707, Decision to Grant a Patent, dated Jun. 22, 2023, 5 pgs.
Tencent Technology, Extended European Search Report and Supplementary Search Report, EP21812015.2, dated Nov. 29, 2022, 8 pgs.
Tencent Technology, WO, PCT/CN2021/088899, Jul. 21, 2021, 5 pgs.
Tencent Technology, IPRP, PCT/CN2021/088899, dated Nov. 17, 2022, 6 pgs.

* cited by examiner

BLOCKCHAIN-BASED DATA PROCESSING METHOD AND APPARATUS, DEVICE, AND READABLE STORAGE MEDIUM

CROSS-REFERENCE TO RELATED APPLICATIONS

This application is a continuation application of PCT Patent Application No. PCT/CN2021/088899, entitled "BLOCKCHAIN-BASED DATA PROCESSING METHOD, APPARATUS AND DEVICE, AND READABLE STORAGE MEDIUM" filed on Apr. 22, 2021, which claims priority to Chinese Patent Application No. 202010458171.4, filed with the State Intellectual Property Office of the People's Republic of China on May 27, 2020, and entitled "BLOCKCHAIN-BASED DATA PROCESSING METHOD AND APPARATUS, DEVICE, AND READABLE STORAGE MEDIUM", all of which are incorporated herein by reference in their entirety.

FIELD OF THE TECHNOLOGY

This application relates to the field of computer technologies, and in particular, to a blockchain-based data processing method and apparatus, a device, and a computer-readable storage medium.

BACKGROUND OF THE DISCLOSURE

A blockchain is a new application mode of computer technologies such as distributed data storage, point-to-point transmission, a consensus mechanism, and an encryption algorithm and is mainly configured to sort data according to a time sequence and encrypt the data to form a ledger, so that the data cannot be tampered and forged. In addition, the data can be verified, stored, and updated. The blockchain may further perform encrypted data transmission, node recognition, and secure access and is an advanced distributed infrastructure.

In a blockchain network, a process of writing transaction data into a ledger may be that: a consensus node obtains transaction data, packs the transaction data into a block, performs a consensus process on the block, and writes the block carried with the transaction data into the ledger after the consensus is reached.

In the process in which the consensus node writes the transaction data into the ledger, different consensus nodes may have different accounting processing speeds, that is, fast or low, so that a consensus node that first completes accounting first enters a consensus process of a next block. In addition, due to a low speed, a consensus node that performs accounting relatively slowly cannot keep up with a consensus node that performs accounting relatively fast when storing a block. When the consensus process of the next block is performed, consensus failure may be caused by inconsistent block heights, affecting a consensus success rate.

SUMMARY

A blockchain-based data processing method is provided, performed by a first node, the first node being a computer device, the method including:

transmitting first consensus voting information for a target block to a second node, and receiving second consensus voting information for the target block transmitted by the second node;

determining a consensus result for the target block according to the first consensus voting information and the second consensus voting information, opening (e.g., activating) an accounting duration window in accordance with a determination that the consensus result is a consensus success result, performing accounting processing on the target block in the accounting duration window, and receiving a first accounting completion message for the target block transmitted by the second node in the accounting duration window;

transmitting a second accounting completion message to the second node in accordance with a determination that accounting processing target block is completed in the accounting duration window; and closing the accounting duration window in accordance with a determination that a sum of total quantities of first accounting completion messages and second accounting completion messages is greater than or equal to a quantity threshold, and entering a consensus service process of a subsequent block of the target block.

A blockchain-based data processing apparatus is provided, including:

a voting information interaction module, configured to transmit first consensus voting information for a target block to a second node, and receive second consensus voting information for the target block transmitted by the second node;

a consensus result determining module, configured to determine a consensus result for the target block according to the first consensus voting information and the second consensus voting information;

an accounting processing module, configured to open an accounting duration window in accordance with a determination that the consensus result is a consensus success result, and perform accounting processing on the target block in the accounting duration window;

an accounting completion receiving module, configured to receive, in the accounting duration window, a first accounting completion message for the target block transmitted by the second node;

an accounting completion notification module, configured to transmit a second accounting completion message to the second node in accordance with a determination that accounting processing on the target block is completed in the accounting duration window; and a window closing module, configured to close the accounting duration window in accordance with a determination that a sum of total quantities of first accounting completion messages and second accounting completion messages is greater than or equal to a quantity threshold, and enter a consensus service process of a subsequent block of the target block.

A computer device is provided, including a memory and one or more processors, the memory storing computer-readable instructions, and the computer-readable instructions, when being executed by the one or more processors, causing the one or more processors to perform the steps of the blockchain-based data processing method.

One or more non-volatile computer-readable storage media storing computer-readable instructions are provided, the computer-readable instructions, when executed by one or more processors, causing the one or more processors to perform the operations of the blockchain-based data processing method.

A computer program product or a computer program is provided, including computer-readable instructions, the computer-readable instructions being stored in the computer-readable storage medium, a processor of a computer device reading the computer-readable instructions from the computer-readable storage medium, and the processor executing the computer-readable instructions, to cause the computer device to perform the operations of the blockchain-based data processing method.

BRIEF DESCRIPTION OF THE DRAWINGS

To describe the technical solutions of the embodiments of this application or the related art more clearly, the accompanying drawings required for describing the embodiments or the related art are briefly introduced below. Apparently, the accompanying drawings in the following description show merely some embodiments of this application, and a person of ordinary skill in the art may still derive other drawings from these accompanying drawings without creative efforts.

DESCRIPTION OF EMBODIMENTS

The technical solutions in embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Figure 1:
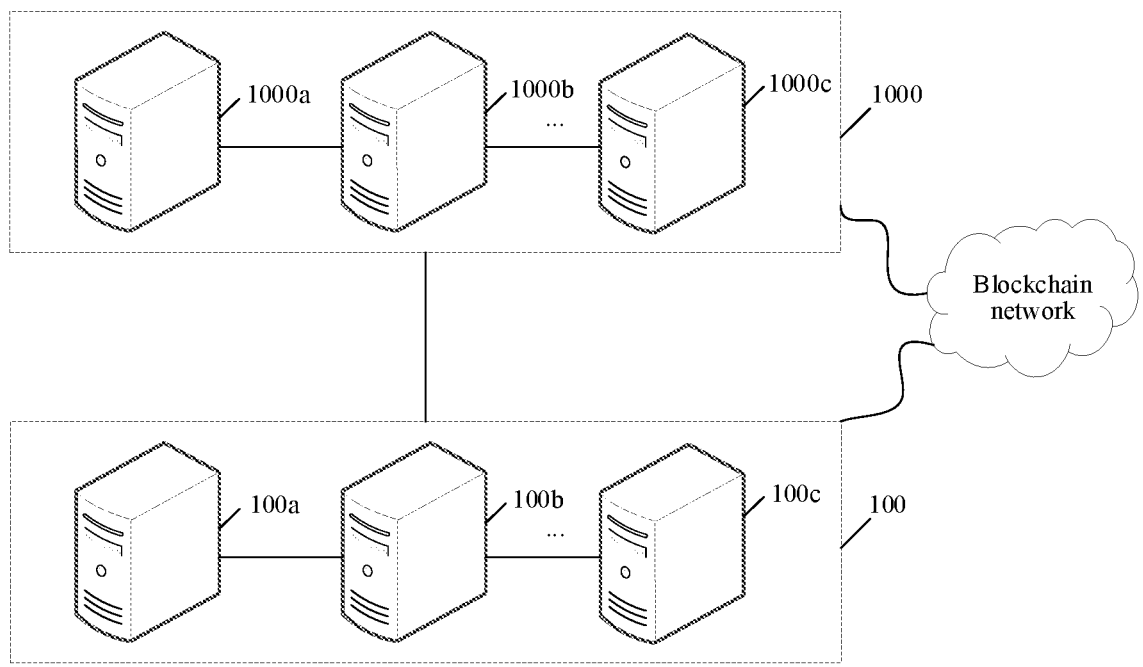
FIG. 1 is a schematic diagram of a network architecture according to an embodiment of this application.

FIG. 1 is a schematic diagram of a network architecture according to an embodiment of this application. A blockchain is a new application mode of computer technologies such as distributed data storage, point-to-point transmission, a consensus mechanism, and an encryption algorithm and is mainly configured to sort data according to a time sequence and encrypt the data to form a ledger, so that the data cannot be tampered and forged. In addition, the data can be verified, stored, and updated. The blockchain is essentially a decentralized database. Each node in the database stores a same blockchain, and the node is classified as a core node, a data node, and a light node in a blockchain network, the core node being responsible for consensus of the entire blockchain network, that is, the core node being a consensus node in the blockchain network. A process of writing transaction data into a ledger in the blockchain network may be that a client transmits transaction data to a data node or a light node, then the transaction data is transmitted between the data node or the light node in the blockchain network one by one until a consensus node receives the transaction data, the consensus node packs the transaction data into a block, performs a consensus with other consensus nodes, and writes the block carried with the transaction data into the ledger after the consensus is reached. As shown in FIG. 1, the system architecture may include a first node cluster 1000 and a second node cluster 100. The first node cluster 1000 may include at least two first nodes, and the second node cluster 100 may include at least two second nodes. As shown in FIG. 1, the first node cluster 1000 may include a first node 1000a, a first node 1000b, . . . , and a first node 1000c, and the second node cluster 100 may specifically include a second node 100a, a second node 100b, . . . , and a second node 100c. The first node 1000a, the first node 1000b, . . . , the first node 1000c, the second node 100a, the second node 100b, . . . , and the second node 100c are all the core nodes (that is, the consensus nodes).

As shown in FIG. 1, the second node 100a, the second node 100b, . . . , and the second node 100c may be respectively in a network connection with the first node 1000a, the first node 1000b, . . . , and the first node 1000c, so that the second nodes may exchange data with the first nodes through the network connection. The second node 100a, the second node 100b, . . . , and the second node 100c are connected with each other, so that data may be exchanged between the second nodes. The first node 1000a, the first node 1000b, . . . , and the first node 1000c are connected with each other, so that data may be exchanged between the first nodes. The first node 1000a is used as an example. After receiving transaction data transmitted by a data node or a light node, the first node 1000a may store the transaction data in a memory pool (for example, a transaction pool) and update a hash tree thereof for recording input data. Subsequently, a timestamp is updated to a time when the transaction data is received, different random numbers are tried, and eigenvalue calculation is performed. When an eigenvalue is obtained, the transaction data can be stored correspondingly, and a block header and a block body are generated, to obtain a newly generated block. Subsequently, the first node 1000a may respectively transmit, according to node identifiers of other core nodes (that is, consensus nodes) in a blockchain network, the newly generated block to the other core nodes in the blockchain network in which the first node is located, the other core nodes verify (that is, reach a consensus on) the newly generated block and add the newly generated block after the verification to a ledger to which the other core nodes belong. Each core node in the blockchain network has a corresponding node identifier, and each core node in the blockchain network may store node identifiers of other core nodes in the blockchain network, to subsequently broadcast a generated block to the other core nodes in the blockchain network according to the node identifiers of the other core nodes. The other core nodes reach a consensus on the newly generated block and add the newly generated block on which the consensus has been reached to a ledger to which the other core nodes belong. In this way, transaction data stored in all the core nodes in the blockchain network is consistent.

For a process in which the core nodes (including the first node and the second node) in the blockchain network add a block to a blockchain to which the core nodes belong, that is, a process in which the core nodes perform accounting on the block, an accounting duration window is newly added in this application. After a consensus is reached on the block, the core nodes need to perform accounting processing on the block in the accounting duration window. A specific method may be that: the first node 1000a, the second node 100a, the second node 100b, and the second node 100c are used as an example, for a consensus on a target block, the first node 1000a, the second node 100a, the second node 100b, and the second node 100c may broadcast consensus voting information to each other. The consensus voting information of first node 1000a, the second node 100a, and the second node 100b is all approval votes, and the second node 100c has not broadcasted the consensus voting information for a network reason. Because the consensus voting information of three consensus nodes among four consensus nodes of the first node 1000a, the second node 100a, the second node 100b, and the second node 100c is the approval votes, a ratio 3/4 of a quantity of nodes with the approval votes to a quantity of all nodes exceeds a ratio threshold (e.g., 2/3 or 67%), a consensus result for the target block may be determined as a consensus success result, and all the first node 1000a, the second node 100a, the second node 100b, and the second node 100c may open (e.g., initiate, trigger, activate, etc.) an accounting duration window having a predetermined time duration, and perform accounting processing on the target block in the accounting duration window. During (e.g., within) the accounting duration window, if a node completes an accounting processing task on the target block, the node may perform broadcasting to notify other nodes that it has completed accounting processing on the target block. If, during the accounting duration window, over 2/3 of the nodes (e.g., over a threshold percentage of the nodes) all complete the accounting processing task on the target block, and when determining that 2/3 of nodes complete the accounting processing task, the nodes that have completed the accounting processing task may close (e.g., end, terminate) the accounting duration window and enter a subsequent process. In some embodiments, the subsequent process is a consensus service process of a subsequent block of the target block. For example, the accounting duration window is 10 s, the first node 1000a completes accounting processing on the target block at 2 s and performs broadcasting for notification, and the first node 1000a waits for completion notifications from the second node 100a, the second node 100b, and the second node 100c in the accounting duration window. At 2.5 s, the second node 100a completes accounting processing on the target block and performs broadcasting for notification. At 3.5 s, the second node 100b completes accounting processing on the target block and performs broadcasting for notification. Therefore, three consensus nodes (the first node 1000a, the second node 100a, and the second node 100b) have completed accounting processing on the target block at 3.5 s, that is, the three consensus nodes among four consensus nodes of the first node 1000a, the second node 100a, the second node 100b, and the second node 100c have completed accounting processing tasks on the target block. All the first node 1000a, the second node 100a, and the second node 100b receive completion notification messages from other consensus nodes that complete accounting processing tasks at 3.5 s, that is, each consensus node of the first node 1000a, the second node 100a, and the second node 100b may determine that a ratio of a quantity of consensus nodes that have completed the accounting processing task to a total quantity of all consensus nodes is 3/4 at 3.5 s, which exceeds the ratio threshold 2/3, so that the first node 1000a, the second node 100a, and the second node 100b close the accounting duration window at 3.5 s and enter a subsequent process, that is, no longer waits for the second node 100c to complete accounting.

According to the blockchain-based data processing method, when a consensus is reached on a block and block accounting is performed, by adding an accounting duration window, consensus nodes (for example, a first node and a second node) perform accounting in the accounting duration window, and each consensus node may perform broadcasting for notification after completing accounting. Among the consensus nodes that perform accounting, when all consensus nodes of which a quantity (e.g., number) exceeds a quantity threshold complete block accounting, the consensus nodes that have completed accounting close the accounting duration window and enter a consensus process of a next block. In this way, the consensus nodes that first complete block accounting may wait for other consensus nodes to complete block accounting in the accounting duration window and then enter the consensus process of the next block together. It can be learned that in the accounting duration window, because consensus nodes with a high speed (e.g., higher processing speeds) wait for consensus nodes with a relatively low speed (e.g., slower processing speeds) to perform accounting, the consensus nodes that enter the consensus process of the next block together may store a same block. In this way, when a consensus is reached on a next block, consensus failure of the consensus node caused by inconsistent block heights may be reduced, so that a consensus success rate of a consensus service process can be improved.

It can be understood that each first node in the first node cluster 1000 and each second node in the second node cluster 100 may be cloud servers. The cloud servers may provide basic cloud computing services such as a cloud service, a cloud database, cloud computing, a cloud function, cloud storage, a network service, cloud communication, a middleware service, a domain name service, a security service, a CDN, and a big data and artificial intelligence platform. The terminal and the server may be directly or indirectly connected in a wired or wireless communication manner. This is not limited in this application.

A cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries requires strong system support and this can only be implemented through cloud computing.

It can be understood that the method provided in this embodiment of this application may be performed by a computer device, and the computer device includes, but not limited to, a terminal or a server. The server may be an independent physical server, or may be a server cluster including a plurality of physical servers or a distributed system, or may be a cloud server. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application. The node in this embodiment of this application may be the computer device.

Figure 2:
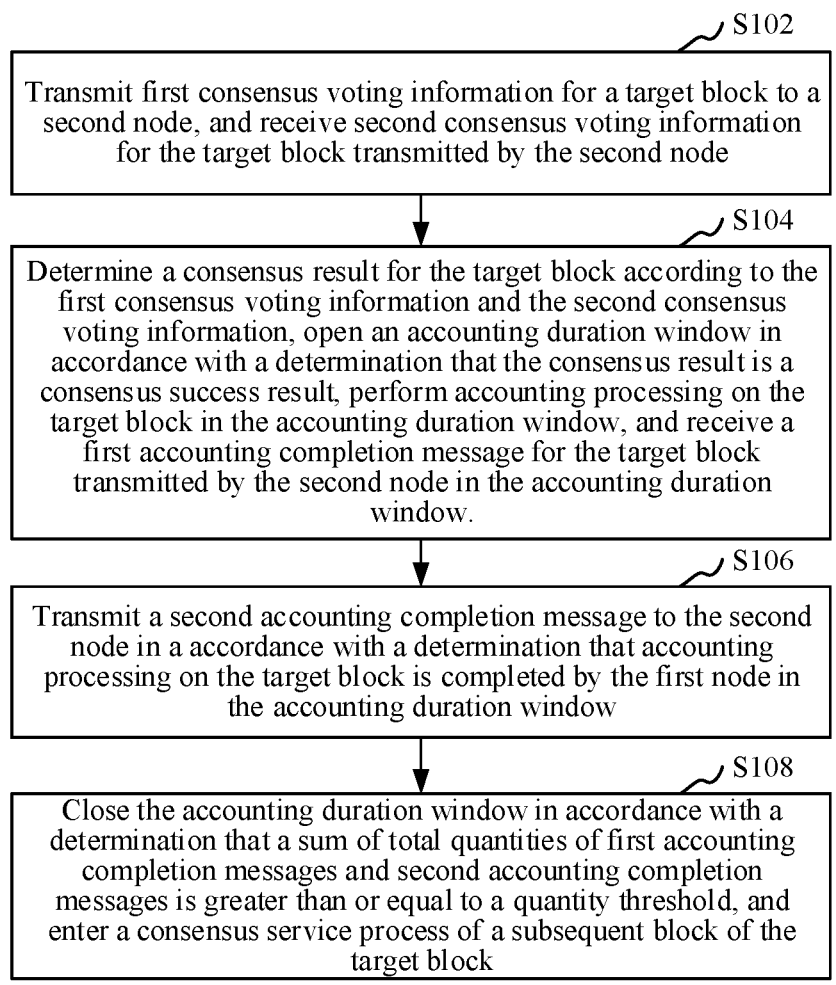
FIG. 2 is a schematic flowchart of a blockchain-based data processing method according to an embodiment of this application.

FIG. 2 is a schematic flowchart of a blockchain-based data processing method according to an embodiment of this application. An example in which the method is applicable to a first node is used for description, the first node is a computer device, and the computer device may be a terminal or may be a server. As shown in FIG. 2, the blockchain-based data processing method includes the following steps.

Step S101. Transmit first consensus voting information for a target block to a second node, and receive second consensus voting information for the target block transmitted by the second node.

Specifically, both the first node and the second node may be core nodes (consensus nodes) in a blockchain network and may be responsible for reaching a consensus on the entire blockchain network and writing a block carrying transaction data into a local ledger. After receiving transaction data, a consensus node may pack the transaction data into a block and perform a consensus with other consensus nodes. The other consensus nodes transmit consensus voting information to each other. The consensus voting information includes a consensus-reached approval vote (or an approval vote) and a consensus-reached rejecting vote, and each of the first consensus voting information and the second consensus voting information may also include the consensus-reached approval vote and the consensus-reached rejecting vote. In a blockchain network, when generating a new block (for example, a target block) according to transaction data, each core node may transmit the newly generated block to other core nodes in the blockchain network, and the other core nodes verify the newly generated block. That is, the core nodes in the blockchain network transmit consensus voting information for the newly generated block and notify the other core nodes of a verification result of the core nodes. If the verification succeeds, the consensus voting information is to agree to reach a consensus on the newly generated block, and if the verification fails, the consensus voting information is to reject to reach the consensus on the newly generated block. A core node that generates a new block may be used as a block generation node, so that both the first node and the second node may be used as block generation nodes. When a node is the block generation node, consensus voting information thereof is to agree to reach a consensus on a block.

Step S102. Determine a consensus result for the target block according to the first consensus voting information and the second consensus voting information, open (e.g., activate, start, trigger) an accounting duration window in accordance with a determination that the consensus result is a consensus success result, perform accounting processing on the target block in the accounting duration window, and receive a first accounting completion message for the target block transmitted by the second node in the accounting duration window.

In an embodiment, the determining a consensus result for the target block according to the first consensus voting information and the second consensus voting information includes:

determining, in the second consensus voting information, a quantity of pieces of second consensus voting information being approval votes as a first target quantity; determining a total quantity of approval votes according to the first consensus voting information and the first target quantity in accordance with a determination that the first consensus voting information is the approval vote; determining, in accordance with a determination that a ratio of the total quantity of approval votes to a total quantity of nodes is greater than or equal to a ratio threshold, the consensus result for the target block as the consensus success result, the total quantity of nodes being total quantities of first nodes and second nodes; and determining, in accordance with a determination that the ratio of the total quantity of approval votes to the total quantity of nodes is less than the ratio threshold, the consensus result for the target block as a consensus failure result.

Specifically, the first node may determine a consensus result for the target block according to the received second consensus voting information transmitted by the second node. A specific determining method may be that the first node may determine, in the second consensus voting information, a quantity of pieces of second consensus voting information being approval votes (that is, agreeing to reach a consensus on the target block) as a first target quantity; the first node may determine a total number (e.g., quantity) of approval votes according to the first consensus voting information and the first target quantity in accordance with a determination that the first node agrees to reach the consensus on the target block; the first node may determine, in accordance with a determination that a ratio of the total quantity of approval votes to a total quantity of nodes is greater than or equal to a ratio threshold, the consensus result for the target block as the consensus success result, the total quantity of nodes being total quantities of first nodes and second nodes; and the first node may determine, in accordance with a determination that the ratio of the total quantity of approval votes to the total quantity of nodes is less than the ratio threshold, the consensus result for the target block as a consensus failure result. Because the first node and the second node are the core nodes (the consensus nodes) in the blockchain network, that is, when consensus nodes exceeding or reaching a ratio threshold in the blockchain network agree to reach a consensus on the target block, a consensus result for the target block is determined as a consensus success result. In the blockchain network, the core nodes agreeing to reach the consensus on the target block do not exceed the ratio threshold, the consensus result for the target block is determined as a consensus failure result. The ratio threshold may be in the form of a decimal, a percentage, a fraction, or the like. For example, the ratio threshold is 0.67, 2/3, 80%, or the like, which is not described one by one by using examples.

For example, the consensus nodes include a total of a first node a, a second node d, a second node b, and a second node c. For consensus voting on a block a, first consensus voting information of the first node a is an approval vote, second consensus voting information of the second node d is a consensus-reached rejecting vote, second consensus voting information of the second node b is an approval vote, and second consensus voting information of the second node c is an approval vote. Among four consensus nodes of the first node a, the second node d, the second node b, and the second node c, three consensus nodes of the first node a, the second node b, and the second node c are the approval votes, a total quantity of approval votes is three, and a ratio of the total quantity 3 of approval votes to a total quantity 4 of nodes is 3/4. The ratio threshold is 2/3. It can be learned that the ratio 3/4 is greater than the ratio threshold 2/3, and the first node a may determine a consensus result for the block a as a consensus success result.

In an embodiment, the method further includes:

determining the total quantity of approval votes according to the first target quantity in accordance with a determination that the first consensus voting information is a consensus-reached rejecting vote.

Specifically, the first node may determine, in the second consensus voting information, a quantity of pieces of second consensus voting information being approval votes (that is, agreeing to reach a consensus on the target block) as a first target quantity; the first node may determine a total quantity of approval votes according to the first target quantity in accordance with a determination that the first node rejects to reach the consensus on the target block; the first node may determine, in accordance with a determination that a ratio of the total quantity of approval votes to a total quantity of nodes is greater than or equal to a ratio threshold, the consensus result for the target block as the consensus success result, the total quantity of nodes being total quantities of first nodes and second nodes; and the first node may determine, in accordance with a determination that the ratio of the total quantity of approval votes to the total quantity of nodes is less than the ratio threshold, the consensus result for the target block as a consensus failure result. In the blockchain network, when consensus nodes exceeding or reaching a ratio threshold agree to reach a consensus on the target block, a consensus result for the target block may be determined as a consensus success result. Therefore, even if the first node rejects to reach the consensus on the target block, as long as the consensus nodes in the blockchain network exceeding or reaching the ratio threshold agree to reach the consensus on the target block, the consensus result for the target block is determined as the consensus success result.

In an embodiment, the opening an accounting duration window in accordance with a determination that the consensus result is a consensus success result, and performing accounting processing on the target block in the accounting duration window includes:

obtaining a quantity of pieces of second consensus voting information in accordance with a determination that the consensus result is the consensus success result; obtaining a quantity of second nodes as a second target quantity; opening the accounting duration window in accordance with a determination that the quantity of pieces of second consensus voting information is less than the second target quantity, and performing accounting processing on the target block in the accounting duration window.

Specifically, when determining the consensus result for the target block as the consensus success result, the first node may obtain a quantity of pieces of second consensus voting information and obtain a quantity of second nodes as a second target quantity; and the first node may open the accounting duration window in accordance with a determination that the quantity of pieces of second consensus voting information is less than the second target quantity, and perform accounting processing on the target block in the accounting duration window. It may be understood that the quantity of pieces of second consensus voting information is less than the second target quantity, that is, the first node has received only consensus voting information of some second nodes, and some second nodes may still not transmit consensus voting information to the first node in time due to a network delay, a slow verification speed, and the like. The first node does not receive the consensus voting information of some second nodes. In this case, the first node opens the accounting duration window and performs accounting in the accounting duration window. That is, when the consensus result for the target block is the consensus success result, and the first node receives only the consensus voting information of some second nodes, the first node opens the accounting duration window and performs accounting processing on the target block in the accounting duration window.

For example, the consensus nodes include a total of a first node a, a second node d, a second node b, and a second node c. For a consensus vote of a block b, the first node a agrees to reach a consensus on the block b, the second node d agrees to reach the consensus on the block b, and the second node b agrees to reach the consensus on the block b, so that consensus voting information of the first node a, the second node d, and the second node b are all approval votes. The second node c does not broadcast consensus voting information for a reason of a network. For the first node a, first consensus voting information of the first node a is the approval vote, the consensus voting information of the second node d is second consensus voting information and is the approval vote, and the consensus voting information of the second node b is the second consensus voting information and is the approval vote. Therefore, in the blockchain network, a total of three consensus nodes of the first node a, the second node d, and the second node b are the approval votes. Although the consensus voting information of the second node c has not been received (the first node a has received only the consensus voting information of some second nodes, and a quantity of pieces of second consensus voting information is less than a quantity of second nodes), in the received consensus voting information, a ratio 3/4 of a quantity (three) of nodes with the approval votes to a total quantity (four) of nodes in the blockchain network exceeds the ratio threshold 2/3, so that the first node a opens an accounting duration window and performs accounting processing in the accounting duration window. That is, the first node has received only the consensus voting information of some second nodes, and in the second nodes and the first node, a ratio of a quantity of approval votes to a total quantity of nodes in the blockchain network exceeds the ratio threshold, the first node no longer cares whether consensus voting information of remaining second nodes is approval votes but directly opens the accounting duration window and performs accounting processing on the target block in the accounting duration window.

When the first node and the second nodes perform accounting processing in the accounting duration window, and if completing accounting processing on the target block, a node may broadcast an accounting completion message to notify other nodes that accounting processing on the target block has been completed by the node. In the accounting duration window, a second node completes accounting processing on the target block, the second node performs broadcasting for notification, and the first node may receive an accounting completion message from the second node that has completed accounting.

Step S103. Transmit a second accounting completion message to the second node in accordance with a determination that accounting processing on the target block is completed by the first node in the accounting duration window.

In an embodiment, there are a plurality of second nodes; and the transmitting a second accounting completion message to the second node in accordance with a determination that accounting processing on the target block is completed in the accounting duration window includes:

receiving, in the accounting duration window, third consensus voting information for the target block transmitted by remaining second nodes, the remaining second nodes being nodes in the plurality of second nodes other than the second node that has transmitted the second consensus voting information; obtaining a quantity of pieces of third consensus voting information in accordance with a determination that accounting processing on the target block is completed in the accounting duration window; adding the quantity of pieces of third consensus voting information to the quantity of pieces of second consensus voting information, to obtain a total quantity of consensus votes; detecting a message transmitting permission of the first node according to the total quantity of consensus votes and the second target quantity; and transmitting the second accounting completion message to the second node in accordance with a determination that the first node has the message transmitting permission.

Specifically, when receiving only consensus voting information of some second nodes, the first node enters the accounting duration window, and when performing accounting processing on the target block in the accounting duration window, the first node may still receive consensus voting information (third consensus voting information) transmitted by remaining second nodes (nodes in the second nodes other than the second node that has transmitted the second consensus voting information, that is, the second nodes that have not transmitted the consensus voting information). That is, the remaining second nodes may not transmit the consensus voting information in time due to a network or other causes, when performing accounting processing in the accounting duration window, the first node receives the consensus voting information of the remaining second nodes, and the first node may determine, according to the third consensus voting information of the remaining second nodes, whether the first node has a message transmitting permission of transmitting an accounting completion message. A specific method may be that if the first node completes accounting processing on the target block in the accounting duration window, the first node may obtain a quantity of pieces of third consensus voting information, the first node may add the quantity of pieces of third consensus voting information to the quantity of pieces of second consensus voting information, to obtain a total quantity of consensus votes, and determine whether the first node has a message transmitting permission according to the total quantity of consensus votes and the second target quantity, and when the first node has the message transmitting permission, the first node transmits the second accounting completion message to the second node.

In an embodiment, the detecting a message transmitting permission of the first node according to the total quantity of consensus votes and the second target quantity includes:

determining that the first node has the message transmitting permission in accordance with a determination that the total quantity of consensus votes is less than the second target quantity; and determining that the first node has no message transmitting permission in accordance with a determination that the total quantity of consensus votes is equal to the second target quantity.

Specifically, when the total quantity of consensus votes is less than the quantity of second nodes (the second target quantity), the first node may determine that the first node has the message transmitting permission, and the first node may transmit the accounting completion message to the second node and perform broadcasting to notify that block accounting has been completed by the first node. Conversely, if the total quantity of consensus votes is equal to the second target quantity of second nodes, the first node may determine that the first node has no message transmitting permission, and the first node does not transmit the accounting completion message to the second node when completing block accounting in the accounting duration window, and may directly close the accounting duration window and enter a consensus service process of a subsequent block of the target block.

In an embodiment, the method further includes:

closing the accounting duration window in accordance with a determination that the first node has no message transmitting permission, and entering the consensus service process of the subsequent block of the target block.

Specifically, if the total quantity of consensus votes is equal to the second target quantity of second nodes, the first node may determine that the first node has no message transmitting permission, and the first node does not transmit the accounting completion message to the second node when completing block accounting in the accounting duration window and may directly close the accounting duration window and enter the consensus service process of the subsequent block of the target block. If the total quantity of consensus votes is equal to the second target quantity of second nodes, the first node may determine that the first node has received the consensus voting information of all the second nodes in the accounting duration window, and the first node determines by default that other nodes in the blockchain network have also received all the consensus voting information, and the other nodes may keep a similar accounting speed To reduce traffic consumption caused by transmission of a message, the first node cancels the message transmitting permission. Therefore, without the message transmitting permission, after completing accounting, a consensus node may no longer transmit an accounting completion message to other nodes. Therefore, the traffic consumption can be reduced, and a speed of entering the consensus service process of the subsequent block can be improved. Once accounting is completed and all votes are received, a completion notification is no longer transmitted, the accounting duration window is directly closed, and the consensus service process of the subsequent block is entered.

It may be understood that if the first node has received all voting information in the accounting duration window, the first node may also choose to transmit the accounting completion message to the second node when completing accounting. In this way, the second node that does not receive all the voting information due to a network in the accounting duration window may determine, according to the accounting completion message transmitted by the first node, whether the second node may close the accounting duration window.

It may be understood that when the first node performs accounting processing on the target block in the accounting duration window, and if the first node receives only the consensus voting information transmitted by the remaining second nodes in the accounting duration window or does not receive the consensus voting information of the remaining second nodes (the total quantity of consensus votes is equal to the second target quantity of second nodes), the first node transmits the accounting completion message to the second nodes after completing accounting on the target block and waits for nodes that do not complete accounting to perform accounting in the accounting duration window. If the first node receives the consensus voting information transmitted by all the remaining second nodes, that is, the first node receives the consensus voting information of all the second nodes in the blockchain network in the accounting duration window (the total quantity of consensus votes is equal to the second target quantity of second nodes), the first node may directly close the accounting duration window after completing accounting on the target block and directly enter a process of a next block of the target block without waiting for other consensus nodes. The reason why the first node may no longer wait for other consensus nodes to perform accounting is as follows: because in the accounting duration window, all the second nodes in the blockchain network successfully transmit voting information, and the first node receives the consensus voting information of all the second nodes in the accounting duration window, the first node considers that network statuses of the other consensus nodes are all in a good state (because all the consensus voting information has been successfully received), and the first node may determine that statuses (for example, a network status or an information synchronization status) of the consensus nodes are not much different and speeds of performing block accounting may keep consistent. Without waiting, block accounting may also be respectively completed at close times, and a difference between stored blocks is also small when the subsequent process is entered.

Step S104. The first node closes the accounting duration window in accordance with a determination that a sum of total quantities of first accounting completion messages and second accounting completion messages is greater than or equal to a quantity threshold, and enters a consensus service process of a subsequent block of the target block.

Specifically, in the accounting duration window, if nodes of which a quantity exceeds a quantity threshold complete accounting processing on the target block (a sum of total quantities of first accounting completion messages and second accounting completion messages is greater than or equal to the quantity threshold), the nodes that have completed accounting processing may close the accounting duration window, that is, exit from the accounting duration window, and enter a subsequent process, for example, enter a consensus service process of a next block of the target block. It may be understood that in the accounting duration window, when a node that first completes accounting processing does not receive consensus voting information of all remaining nodes (nodes in the blockchain network that fail to transmit the consensus voting information), the node performs broadcasting to notify that accounting processing has been completed by the node and waits for other nodes to perform accounting in the accounting duration window, and until nodes of which a quantity exceeds the quantity threshold complete accounting processing, the nodes that have completed accounting close the accounting duration window, and enter the subsequent process. The quantity threshold may be determined according to the total quantity of nodes in the blockchain network and a given ratio. For example, if the given ratio is 3/5, the quantity threshold may be 3/5 of the total quantity of nodes, that is, when nodes of which a quantity exceeds or reaches 3/5 in the blockchain network complete accounting, the nodes that have completed accounting may close the accounting duration window.

In an embodiment, the method further includes:
obtaining a duration threshold corresponding to the accounting duration window; obtaining an accumulated duration over which the first node is in the accounting duration window; and closing the accounting duration window in accordance with a determination that the accumulated duration is equal to the duration threshold and accounting processing on the target block is not completed by the first node in the accounting duration window, and entering the consensus service process of the subsequent block of the target block.

For example, consensus nodes in a blockchain network include a consensus node A (or referred to as a first node), a consensus node B, a consensus node C, a consensus node D, and a consensus node E (the consensus node B, the consensus node C, the consensus node D, and the consensus node E are all referred to as second nodes). For block generation voting on a block a, voting information of the consensus node A is an approval vote, voting information of the consensus node B is an approval vote, voting information of the consensus node C is an approval vote, voting information of the consensus node D is an approval vote, and the consensus node E does not transmit voting information due to a network delay. The consensus node A receives the voting information of the consensus node B, the consensus node C, and the consensus node D. It may be determined that the voting information of four consensus nodes in the blockchain network are the approval votes and a ratio of a quantity of approval votes to a total quantity of nodes in the blockchain network is 4/5, so that the consensus node A may determine that a consensus has been reached on the block a, and the consensus node A opens an accounting duration window. Similarly, after receiving voting information of other consensus nodes (the voting information of the consensus node E is not received), the consensus node B, the consensus node C, the consensus node D, and the consensus node E may also determine that a consensus result for the block a is a consensus success result, and the consensus node B, the consensus node C, the consensus node D, and the consensus node E also open the accounting duration window after determining that the consensus has been reached on the block a. All the consensus node A, the consensus node B, the consensus node C, the consensus node D, and the consensus node E perform accounting processing on the block a in the accounting duration window, the accounting duration window being 10 s. At 2 s after entering the accounting duration window, the consensus node B completes accounting processing on the block a, and the consensus node B performs broadcasting at 2 s to notify that accounting processing on the block a has been completed by the consensus node B. Because at 2 s, the consensus node B does not receive accounting completion messages transmitted by other nodes, and only the consensus node B completes accounting processing on the block a, so that the consensus node B waits for the other nodes to complete accounting in the accounting duration window. At 3 s, the consensus node A also completes accounting processing on the block a, and the consensus node A also performs broadcasting for notification. At 3 s, the consensus node B receives an accounting completion message transmitted by the consensus node A, both the consensus node B and the consensus node A may determine that a total of two nodes of the consensus node A and the consensus node B have completed accounting processing on the block a, but a quantity threshold 3 (a total quantity 5 of nodes is multiplied by a ratio threshold 3/5) is not reached, so that the consensus node A and the consensus node B together wait for other nodes to perform accounting in the accounting duration window. At 4 s in the accounting duration window, the consensus node D completes accounting processing on the block a, and the consensus node D also performs broadcasting for notification at 4 s. Both the consensus node A and the consensus node B receive an accounting completion message of the consensus node D at 4 s, so that the consensus node A, the consensus node B, and the consensus node D (the consensus node D has received the accounting completion messages of the consensus node A and the consensus node B) may determine that a total of three nodes of the consensus node A, the consensus node B, and the consensus node D have completed block accounting at 4 s, and a quantity 3 of nodes that have completed accounting is equal to the quantity threshold 3, that is, 3/5 of the nodes among the consensus node A, the consensus node B, the consensus node C, the consensus node D, and the consensus node E have completed block accounting. The consensus node A, the consensus node B, and the consensus node D that have completed block accounting may close the accounting duration window at 4 s and together enter a consensus service process of a next block (for example, a block b) of the block a. The consensus node C and the consensus node E that do not complete block accounting may continue to perform accounting in the accounting duration window, and when block accounting is completed and it has been determined that nodes of which a quantity exceeds the quantity threshold have completed accounting, the consensus node C and the consensus node E close the accounting duration window and enter the consensus service process of the next block of the block a. If one of the consensus node C or the consensus node E has not completed accounting processing on the block a in the accounting duration window all the time, for example, the consensus node E has not completed block accounting in the accounting duration window of 10 s all the time, the consensus node E may close the accounting duration window when an accumulated duration over which the consensus node E enters the accounting duration window reaches a duration threshold (10 s) of the accounting duration window, and enter the consensus service process of the block b. That is, for a node that performs accounting relatively slowly (for example, the consensus node C and the consensus node E), after other nodes that perform accounting fast complete accounting, close the accounting duration window, and enter the subsequent process, the consensus node C and the consensus node E continue to perform accounting. If completing accounting within the duration threshold of the accounting duration window, the consensus node C and the consensus node E may close the accounting duration window after completing accounting and enter the subsequent process. If the consensus node C and the consensus node E have not completed accounting within the duration threshold of the accounting duration window all the time, and when the accumulated duration (starting from a time when the accounting duration window is entered) reaches the duration threshold, that is, the accumulated duration is equal to the duration threshold, the consensus node C and the consensus E may close the accounting duration window and enters the subsequent process.

In an embodiment, the method further includes:

obtaining a duration threshold corresponding to the accounting duration window; counting an accumulated duration over which the first node is in the accounting duration window; and closing the accounting duration window in accordance with a determination that the accumulated duration is equal to the duration threshold and the sum of the total quantities of first accounting completion messages and second accounting completion messages is less than the quantity threshold, and entering the consensus service process of the subsequent block of the target block.

It may be understood that if in an accounting duration window, a node that first completes accounting processing waits for other nodes to perform accounting after performing broadcasting for notification, the node that has completed accounting processing does not receive consensus voting information transmitted by all remaining nodes all the time, and other nodes do not complete accounting or do not receive accounting completion messages of other nodes all the time, when the duration threshold of the accounting duration window is reached, the node determines that a quantity of nodes that have completed accounting is less than a quantity threshold, and both a first node and second nodes (including the node that has completed accounting and the nodes that have not completed accounting) may close the accounting duration window when the duration threshold is reached and together enter the subsequent process. For example, there are five consensus nodes of a first node A, a second node B, a second node C, a second node D, and a second node E in a blockchain network. The first node A, the second node B, the second node C, the second node D, and the second node E perform accounting processing on a block a in an accounting duration window, a duration threshold of the accounting duration window being 10 s. The second node B completes accounting at 2 s, the first node A completes accounting at 3 s, and the second node B and the first node A wait for the second node C, the second node D, and the second node E to perform accounting in the accounting duration window. However, the second node C, the second node D, and the second node E do not complete accounting on the block a all the time, and an accumulated duration over which the second node B and the first node A are in the accounting duration window has reached 10 s (the duration threshold of the accounting duration window is reached), that is, the accumulated duration is equal to the duration threshold. Therefore, the second node B and the first node A close the accounting duration window and enter a consensus service process of a next block of the block a. The second node C, the second node D, and the second node E also close the accounting duration window when the duration threshold 10 s is reached, and enter the consensus service process of the next block of the block a.

If a node that first completes accounting processing receives consensus voting information transmitted by all remaining nodes when waiting for other nodes to perform accounting, and a quantity of nodes that have completed accounting does not exceed a threshold, in this case, the nodes that have completed accounting may also no longer wait for other nodes that do not complete accounting, and the nodes that have completed accounting may also close the accounting duration window and enter the consensus service process of the next block. For example, there are five consensus nodes of a first node A, a second node B, a second node C, a second node D, and a second node E in a blockchain network. The first node A, the second node B, the second node C, and the second node E do not receive consensus voting information of the second node D (that is, receive only consensus voting information of some consensus nodes, and a quantity of approval votes exceeds a threshold), and the first node A, the second node B, the second node C, the second node D, and the second node E enter an accounting duration window and perform accounting processing on a block a in the accounting duration window, a duration threshold of the accounting duration window being 10 s. The second node B completes accounting at 2 s after entering the accounting duration window, the first node A completes accounting at 3 s, the second node B and the first node A mutually receive accounting completion messages from each other, and the second node B and the first node A wait for the second node C, the second node D, and the second node E to perform accounting in the accounting duration window. At 3.5 s, the second node B and the first node A receive consensus voting information of the second node D. In this case, both the second node B and the first node A receive the consensus voting information transmitted by all remaining nodes (the second node D) (that is, the consensus voting information of all other nodes in the blockchain network is received), and the second node B and the first node A no longer wait for the second node C, the second node D, and the second node E to perform accounting. Even if a quantity 2 (one second node B plus one first node A) of nodes that have completed block accounting is less than a quantity threshold 3, the second node B and the first node A still close the accounting duration window and enter a subsequent process, for example, a consensus service process of a next block of the block a.

In an embodiment, the second consensus voting information carries a performance parameter of the second node, and the method further includes:

updating the accounting duration window according to the performance parameter of the second node in accordance with a determination that the quantity of pieces of second consensus voting information is equal to the second target quantity, to obtain an updated accounting duration window, a duration threshold corresponding to the updated accounting duration window being less than a duration threshold corresponding to the accounting duration window; opening the updated accounting duration window, and performing accounting processing on the target block in the updated accounting duration window; and entering the consensus service process of the subsequent block of the target block in accordance with a determination that accounting processing on the target block is completed in the updated accounting duration window.

It may be understood that when the first node determines that the consensus result for the target block is the consensus success result, the first node may obtain a quantity of pieces of second consensus voting information and obtain a quantity of second nodes as a second target quantity. If the quantity of pieces of second consensus voting information is equal to the second target quantity, the first node may obtain a performance parameter of the second node carried in the second consensus voting information and update the accounting duration window according to the performance parameter of the second node, to obtain an updated accounting duration window. The first node may open the updated accounting duration window, and perform accounting processing on the target block in the updated accounting duration window. If completing accounting processing on the target block in the updated accounting duration window, the first node may enter the consensus service process of the subsequent block of the target block. It may be understood that the second consensus voting information carries the performance parameter of the second node, and the performance parameter may include a network parameter, an information transmitting speed, and the like. When the quantity of pieces of second consensus voting information is equal to the second target quantity, that is, the first node receives consensus voting information of all the second nodes in the blockchain network, in this case, because the first node receives the consensus voting information of all the nodes, the first node may consider that network statuses of other second consensus nodes are all good (because the second nodes quickly transmit voting information and all the second nodes quickly transmit voting information), and statuses of the nodes are all good. In this case, the first node may reduce the duration threshold of the accounting duration window according to the performance parameter of the second node, and a better performance parameter (for example, a high information transmitting speed) of the second node indicates a larger reduction amplitude. In this way, the first node and the second node when being in a good state may perform accounting in an accounting duration window with a short duration (for example, 1 s). Herein, the duration threshold may be reduced to 0. That is, when the performance parameter is good, the accounting duration window may not be opened. When the first node receives all votes and the performance parameter of the second node is good, the first node may skip the accounting duration window and directly perform an accounting service process on a target block and enter a consensus service process of a next block after completing the accounting service on the target block. Because the first node receives the consensus voting information of all the second nodes and the performance parameters of the second nodes are good, it may be considered that the first node and the second node have a small difference in a speed of performing accounting, there is no need to wait for each other in the accounting duration window, and stored blocks may be the same or have a small difference. Therefore, the duration threshold of the accounting duration window may be reduced, and the nodes may not be constrained by a duration of the accounting duration window and can quickly enter a subsequent consensus service process.

All the values such as 1 s, 2 s, 10 s, and 3.5 s in the accounting duration window are examples for ease of understanding and indicate no actual meanings.

In this embodiment of this application, an accounting duration window is added for a consensus node, and if consensus voting information of consensus nodes of which a quantity exceeds a quantity threshold received by the consensus node is approval votes, the consensus node no longer cares about voting results of consensus nodes of which consensus voting information is not received, and enters an accounting duration window and performs block accounting in the accounting duration window. If the consensus node receives all voting information in the accounting duration window, the consensus node closes the accounting duration window after completing accounting and enters a subsequent process. If all the voting information is still not received in the accounting duration window, the consensus node waits for other consensus nodes to perform accounting after completing accounting, and until consensus nodes exceeding or being equal to a ratio threshold complete accounting, the consensus nodes that have completed block accounting close the accounting duration window and together enter the subsequent process. It can be learned that a waiting duration is set for the consensus nodes by adding the accounting duration window, and a consensus node with a high accounting speed may wait for a consensus node with a low accounting speed in the accounting duration window. In this way, the consensus nodes that enter the subsequent process may store blocks that are the same or have a small difference, that is, block heights of the consensus nodes are the same or have a small difference. The consensus node may synchronize the block heights with the small difference as the same through block synchronization within a short period of time. In this way, when a consensus is reached on a next block, consensus failure of the consensus node caused by inconsistent block heights may be reduced, so that a consensus success rate of a consensus service process can be improved.

Figure 3:
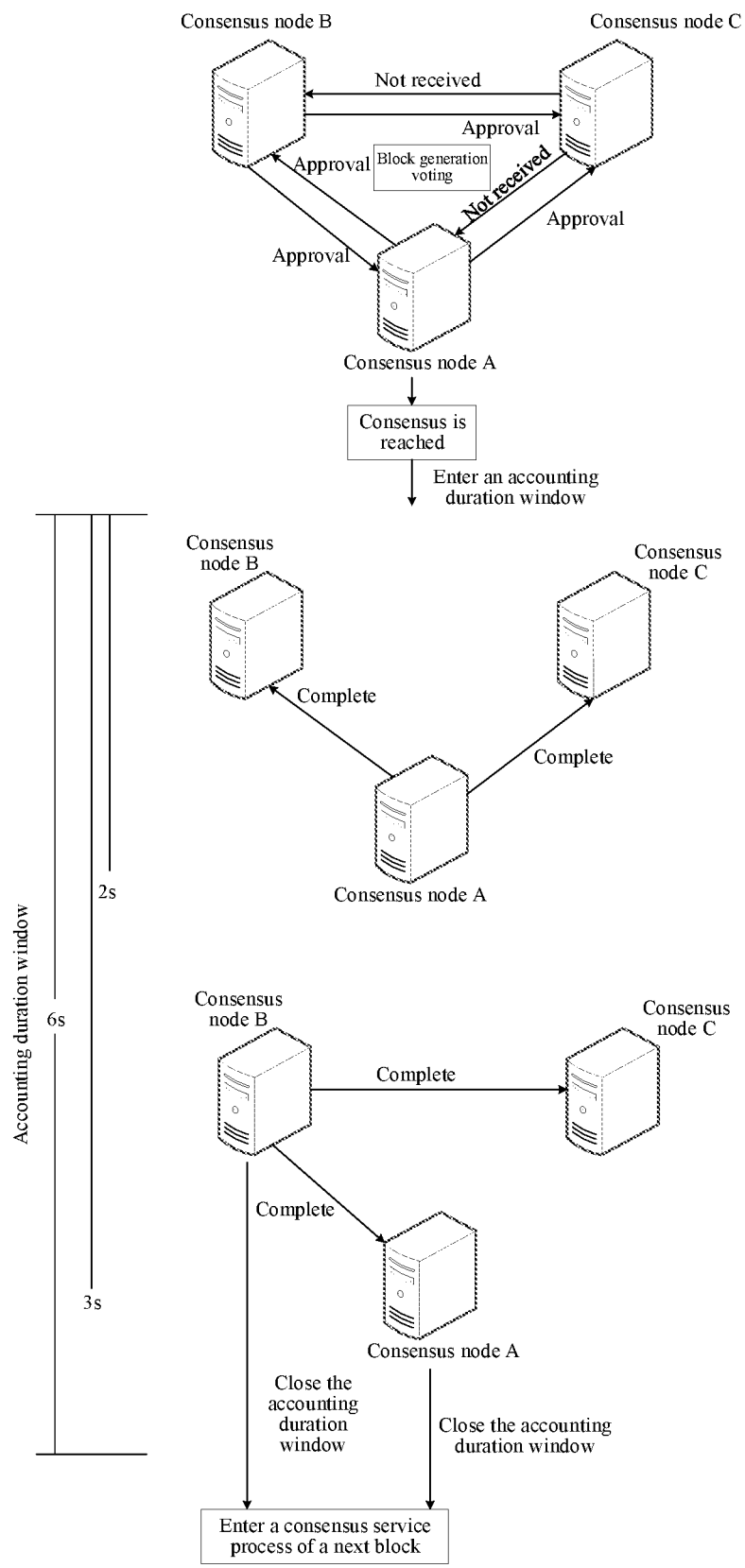
FIG. 3 is a schematic diagram of an accounting scenario according to an embodiment of this application.

Further, FIG. 3 is a schematic diagram of an accounting scenario according to an embodiment of this application. As shown in FIG. 3, a consensus node A may be a block generation node and the consensus node A may be a first node. When block generation voting is performed on a target block, the consensus node A receives voting information of other consensus nodes (for example, a consensus node B and a consensus node C in FIG. 3). Both the consensus node B and the consensus node C may be second nodes. Because speeds at which the consensus nodes transmit information are different, the voting information received by the consensus node A is not received at the same moment. When the consensus node counts that approval votes in the received voting information have exceeded or reached a threshold, the consensus node may determine that a consensus has been reached on the target block. As shown in FIG. 3, the consensus node A has received the voting information of the consensus node B but still does not receive the voting information of the consensus node C. However, there are two approval votes (the consensus node A is the block generation node, and voting information of the block generation node is approval) in three consensus nodes of the consensus node A, the consensus node B, and the consensus node C, a ratio of a quantity (2) of approval votes to a total quantity (3) of consensus nodes is 2/3, and the ratio reaches a predetermined approval ratio 2/3, so that the consensus node A may determine that the consensus has been reached on the target block, and the consensus node A no longer cares about the voting information of the consensus node C, directly opens an accounting duration window, and performs accounting on the target block in the accounting duration window. Similarly, the consensus node B may also receive the voting information of the consensus node A, and the consensus node B may also determine that the consensus has been reached on the target block, so that the consensus node B also opens the accounting duration window and performs accounting on the target block in the accounting duration window. Similarly, the consensus node C may also receive the voting information of the consensus node A and the consensus node B, and the consensus node C may determine that there are three approval votes with reference to the voting information of the consensus node C, so that the consensus node C may also determine that the consensus has been reached on the target block, and the consensus node C also opens the accounting duration window and performs accounting processing on the target block in the accounting duration window. As shown in FIG. 3, the accounting duration window has a total of 6 s, that is, the consensus node A, the consensus node B, and the consensus node C need to perform accounting processing on the target block within 6 s.

As shown in FIG. 3, at 2 s after entering the accounting duration window, the consensus node A completes accounting on the target block, and the consensus node A may transmit an accounting completion message to the consensus node B and the consensus node C to notify that the consensus node A has completed an accounting task on the target block. The voting information of the consensus node C is still not received, only the consensus node A completes accounting on the target block at 2 s of the accounting duration window, and the consensus node A does not receive an accounting completion message of the consensus node B or the consensus node C. Therefore, the consensus node A does not enter a subsequent process and waits for the consensus node B and the consensus node C to perform accounting in the accounting duration window. As shown in FIG. 3, at 3 s after entering the accounting duration window, the consensus node B also completes accounting on the target block, and the consensus node B may transmit the accounting completion message to the consensus node A and the consensus node C, to notify the consensus node A and the consensus node C that the consensus node B has completed an accounting task on the target block. At 3 s of the accounting duration window, the consensus node A receives the accounting completion message transmitted by the consensus node B, and the consensus node B also receives the accounting completion message transmitted by the consensus node A previously. Therefore, both the consensus node A and the consensus node B may determine that only two consensus nodes of the consensus node A and the consensus node B complete accounting on the target block, and a ratio of a quantity 2 of nodes that have completed accounting to a total quantity 3 of nodes in a blockchain network is 2/3, which reaches a specified ratio 2/3, so that the consensus node A and the consensus node B close the accounting duration window and enter the subsequent process. The consensus node C that does not complete accounting continues to perform accounting on the target block in the accounting duration window. Because the consensus node C receives all the voting information (including the voting information of the consensus node A and the voting information of the consensus node B), regardless of whether the consensus node C receives the accounting completion message of the consensus node A or the consensus node B, the consensus node may close the accounting duration window and enter the subsequent process as long as completing accounting.

It can be learned that by adding the accounting duration window, a consensus node (for example, the consensus node A) that first completes block accounting may wait for other consensus nodes to perform block accounting until consensus nodes exceeding or reaching the specified ratio (for example, 2/3) complete block accounting, and the consensus nodes that have completed block accounting close the accounting duration window and together enter a consensus process of a next block. Because the consensus node with a high accounting speed waits for the consensus node with a relatively low accounting speed to perform accounting, the consensus nodes entering the consensus process of the next block together may store same blocks. In this way, when a consensus is reached on the next block, consensus failure of the consensus node caused by inconsistent blocks may be reduced, to improve a subsequent consensus success rate.

Figure 4:
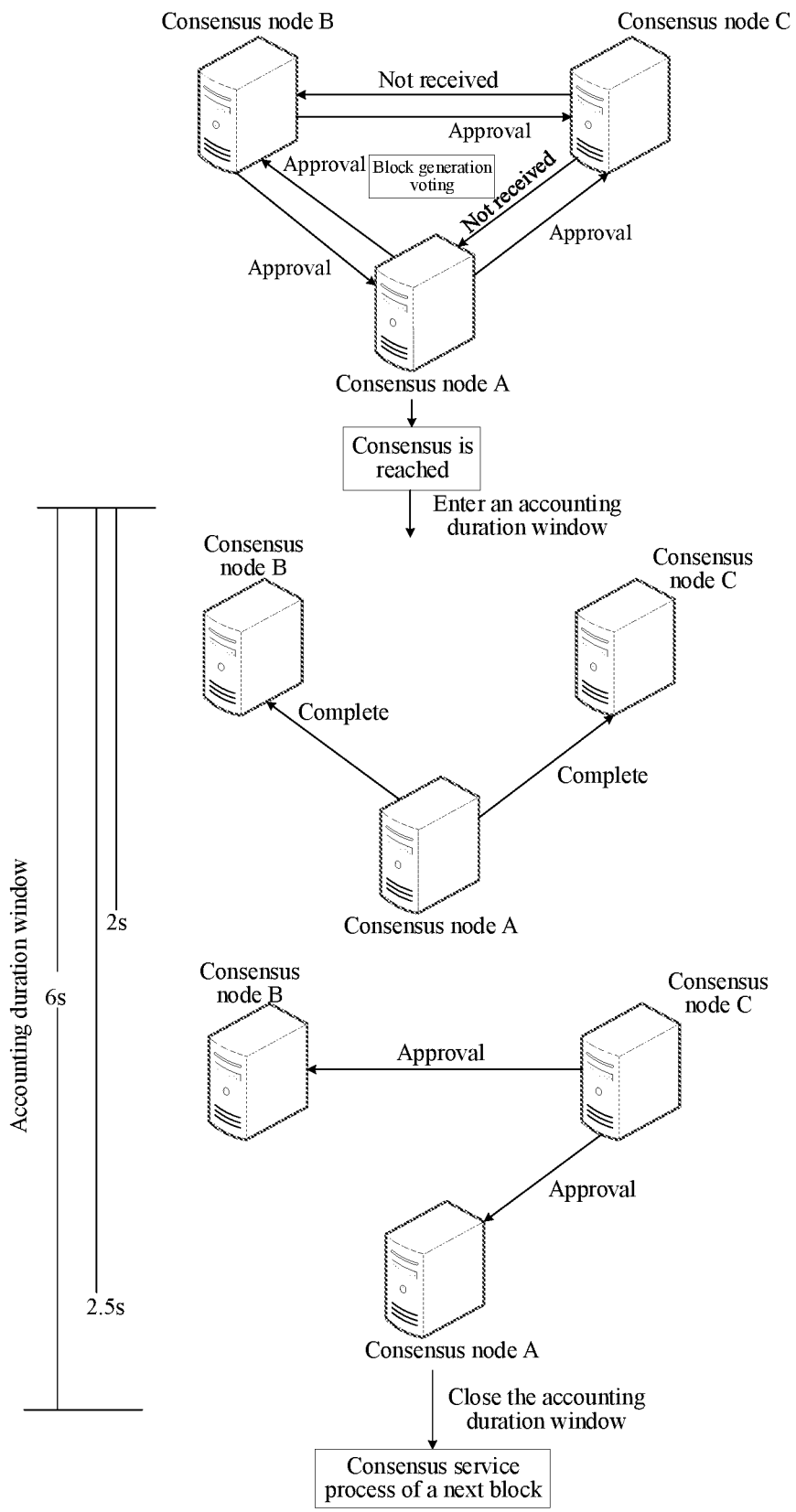
FIG. 4 is a schematic diagram of an accounting scenario according to an embodiment of this application.

FIG. 4 is a schematic diagram of an accounting scenario according to an embodiment of this application. As shown in FIG. 4, a consensus node A may be a block generation node and the consensus node A may be a first node. When block generation voting is performed on a target block, the consensus node A receives voting information of other consensus nodes (for example, a consensus node B and a consensus node C in FIG. 4). Both the consensus node B and the consensus node C may be second nodes. Because speeds at which the consensus nodes transmit information are different, the voting information received by the consensus node A is not received at the same moment. When the consensus node counts that approval votes in the received voting information have exceeded or reached a threshold, the consensus node may determine that a consensus has been reached on the target block. As shown in FIG. 4, the consensus node A has received the voting information of the consensus node B but still does not receive the voting information of the consensus node C. However, there are two approval votes (the consensus node A is the block generation node, and voting information of the block generation node is approval) in three consensus nodes of the consensus node A, the consensus node B, and the consensus node C, a ratio of a quantity (2) of approval votes to a total quantity (3) of consensus nodes is 2/3, and the ratio reaches a predetermined approval ratio 2/3, so that the consensus node A may determine that the consensus has been reached on the target block, and the consensus node A no longer cares about the voting information of the consensus node C, directly opens an accounting duration window, and performs accounting on the target block in the accounting duration window. Similarly, the consensus node B may also receive the voting information of the consensus node A, and the consensus node B may also determine that the consensus has been reached on the target block, so that the consensus node B also opens the accounting duration window and performs accounting on the target block in the accounting duration window. Similarly, the consensus node C may also receive the voting information of the consensus node A and the consensus node B, and the consensus node C may determine that there are three approval votes with reference to the voting information of the consensus node C, so that the consensus node C may also determine that the consensus has been reached on the target block, and the consensus node C also opens the accounting duration window and performs accounting processing on the target block in the accounting duration window.

As shown in FIG. 4, at 2 s after entering the accounting duration window, the consensus node A completes accounting on the target block, and the consensus node A may transmit an accounting completion message to the consensus node B and the consensus node C to notify the consensus node B and the consensus node C that the consensus node A has completed an accounting task on the target block. At 2 s of the accounting duration window, the voting information of the consensus node C is still not received, and an accounting completion message of the consensus node B or the consensus node C is not received, so that the consensus node A may determine that only the consensus node A completes accounting on the target block. Therefore, the consensus node A does not enter a subsequent process and waits for the consensus node B and the consensus node C to perform accounting in the accounting duration window. As shown in FIG. 4, at 2.5 s after entering the accounting duration window, the consensus node A receives the voting information transmitted by the consensus node C, so that the consensus node A receives the voting information of all the consensus nodes (including the consensus node B and the consensus node C) in a blockchain network at 2.5 s of the accounting duration window, and the consensus node A no longer continues to wait for the consensus node B and the consensus node C to perform accounting at 2.5 s and directly closes the accounting duration window and enters a consensus service process of a next block of the target block.

Figure 5:
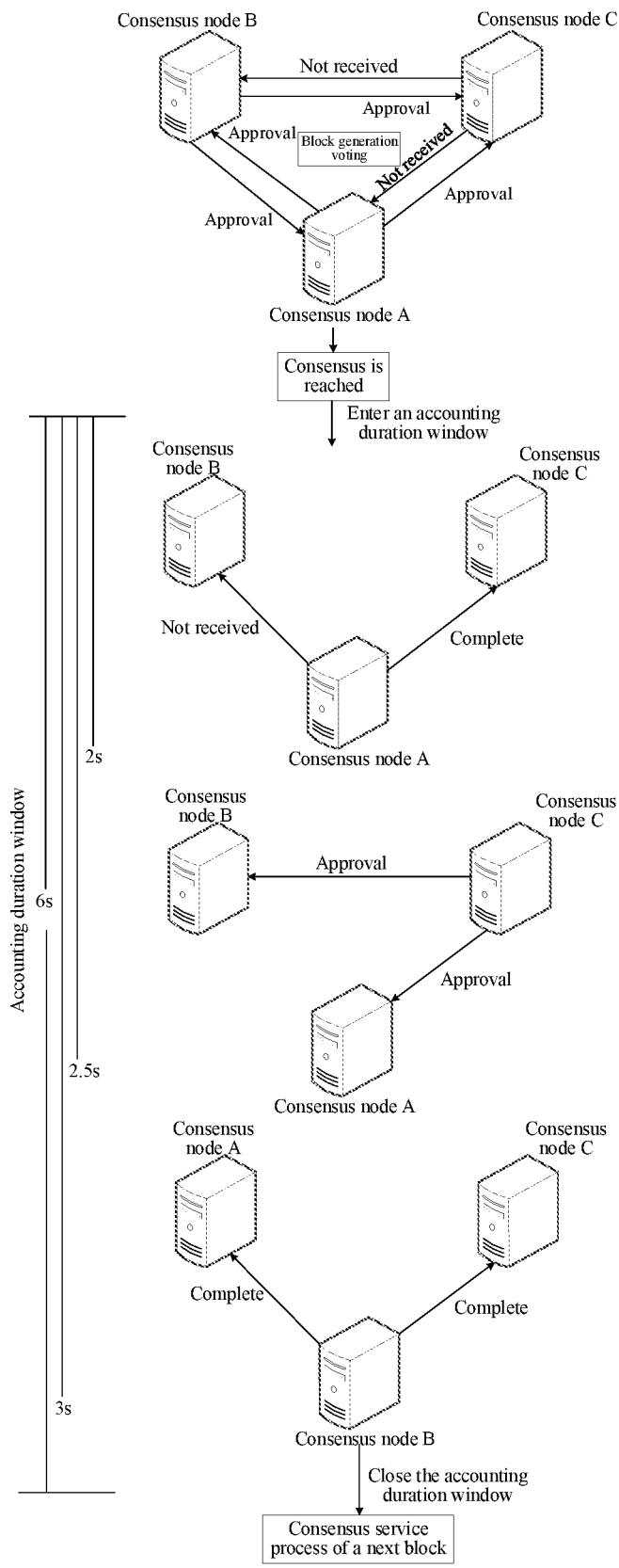
FIG. 5 is a schematic diagram of an accounting scenario according to an embodiment of this application.

Further, FIG. 5 is a schematic diagram of an accounting scenario according to an embodiment of this application. As shown in FIG. 5, a consensus node A may be a block generation node and the consensus node A may be a first node. When block generation voting is performed on a target block, the consensus node A receives voting information of other consensus nodes (for example, a consensus node B and a consensus node C in FIG. 5). Both the consensus node B and the consensus node C may be second nodes. Because speeds at which the consensus nodes transmit information are different, the voting information received by the consensus node A is not received at the same moment. When the consensus node counts that approval votes in the received voting information have exceeded or reached a threshold, the consensus node may determine that a consensus has been reached on the target block. As shown in FIG. 5, the consensus node A has received the voting information of the consensus node B but still does not receive the voting information of the consensus node C. However, there are two approval votes (the consensus node A is the block generation node, and voting information of the block generation node is approval) in three consensus nodes of the consensus node A, the consensus node B, and the consensus node C, a ratio of a quantity (2) of approval votes to a total quantity (3) of consensus nodes is 2/3, and the ratio reaches a predetermined approval ratio 2/3, so that the consensus node A may determine that the consensus has been reached on the target block, and the consensus node A no longer cares about the voting information of the consensus node C, directly opens an accounting duration window, and performs accounting on the target block in the accounting duration window. Similarly, the consensus node B may also receive the voting information of the consensus node A, and the consensus node B may also determine that the consensus has been reached on the target block, so that the consensus node B also opens the accounting duration window and performs accounting on the target block in the accounting duration window. Similarly, the consensus node C may also receive the voting information of the consensus node A and the consensus node B, and the consensus node C may determine that there are three approval votes with reference to the voting information of the consensus node C, so that the consensus node C may also determine that the consensus has been reached on the target block, and the consensus node C also opens the accounting duration window and performs accounting processing on the target block in the accounting duration window.

As shown in FIG. 5, at 2 s after entering the accounting duration window, the consensus node A completes accounting on the target block, the consensus node C receives an accounting completion message of the consensus node A, but the consensus node B does not receive the accounting completion message of the consensus node A. Because the consensus node B has not completed accounting on the target block, the consensus node B continues to perform accounting processing on the target block. As shown in FIG. 5, at 2.5 s after entering the accounting duration window, the consensus node B receives the voting information (approval) transmitted by the consensus node C, so that the consensus node B receives the voting information of all the consensus nodes (including the consensus node A and the consensus node C) in a blockchain network at 2.5 s after entering the accounting duration window. In this case, the consensus node B has not completed accounting on the target block and the consensus node B continues to perform accounting. As shown in FIG. 5, at 3 s after entering the accounting duration window, the consensus node B completes accounting on the target block. Because the consensus node B has received the voting information of the consensus node C previously at 2.5 s, when the consensus node B completes accounting at 3 s, although the consensus node B considers that only the consensus node B completes block accounting and a quantity of nodes does not reach a quantity threshold 2, the consensus node still closes the accounting duration window without waiting for other consensus nodes and directly enters a subsequent process, for example, enter a consensus service process of a next block of the target block.

For the consensus node C, at 2 s after entering the accounting duration window, the consensus node A completes block accounting, and the consensus node C receives the accounting completion message of the consensus node A at 2 s. Because the consensus node C has not completed block accounting, the consensus node C continues to perform accounting on the block A. At 3 s, the consensus node C receives the accounting completion message of the consensus node B, and the consensus node C continues to perform block accounting. In the accounting duration window, the consensus node C does not complete accounting processing on the target block all the time, so that when the duration threshold of 6 s is reached, the consensus node C closes the accounting duration window and enters the consensus service process of the next block of the target block.

It may be understood that in the embodiment corresponding to FIG. 5, if in the accounting duration window, the consensus node A and the consensus node B still do not receive the voting information transmitted by the consensus node C, that is, at 2.5 s, the consensus node A and the consensus node B do not receive the voting information transmitted by the consensus node C, when completing accounting at 2 s after entering the accounting duration window, the consensus node A does not close the accounting duration window and waits for the consensus node B and the consensus node C to perform accounting. However, the consensus node B and the consensus node C have not completed accounting all the time. When 6 s is reached, the consensus node A that has completed accounting and the consensus node B and the consensus node C that have not completed accounting all close the accounting duration window and together enter the consensus service process of the next block of the target block.

It can be learned with reference to FIG. 4 and FIG. 5 that by adding an accounting duration window for consensus nodes, the consensus nodes may perform block accounting in the accounting duration window, a consensus node that first completes block accounting may wait for other consensus nodes to perform block accounting until consensus nodes exceeding or reaching a given ratio (for example, 2/3) all complete block accounting, and the consensus nodes that have completed block accounting close the accounting duration window and together enter a consensus process of a next block. In addition, even if the consensus nodes that have completed accounting have not exceeded the given ratio, the consensus node that first completes block accounting also waits for the consensus nodes with a low accounting speed all the time in the accounting duration window and enters the consensus process of the next block together with the consensus nodes with the low accounting speed when a duration threshold of the accounting duration window is reached. In this way, a difference between blocks stored in the consensus nodes with the low accounting speed and blocks stored in the nodes with a high accounting speed may be reduced, so that when the consensus nodes together enter the consensus process of the next block, the blocks stored in the consensus nodes are not much different, thereby improving a subsequent consensus success rate. If the consensus node receives voting information of all the consensus nodes in the accounting duration window, the consensus node that first completes accounting may directly close the accounting duration window after completing block accounting and enter the consensus process of the next block. Because other consensus nodes successfully transmit the voting information, network statuses of the consensus nodes are all in a good state. It may be considered that statuses of the consensus nodes are not much different, and speeds of performing block accounting may be basically kept consistent. When the consensus nodes enter the consensus process of the next block, blocks stored in the consensus nodes are also slightly different, the consensus nodes may synchronize different blocks stored in slightly behind nodes in a short period of time through block synchronization. In this way, the consensus nodes can keep the stored blocks consistent in a short period of time, which can improve a subsequent consensus success rate.

In FIG. 3, FIG. 4, and FIG. 5, all the values such as 2 s, 3 s, 2.5 s, and 6 s in the accounting duration window are examples for ease of understanding and indicate no actual meanings.

Figure 6:
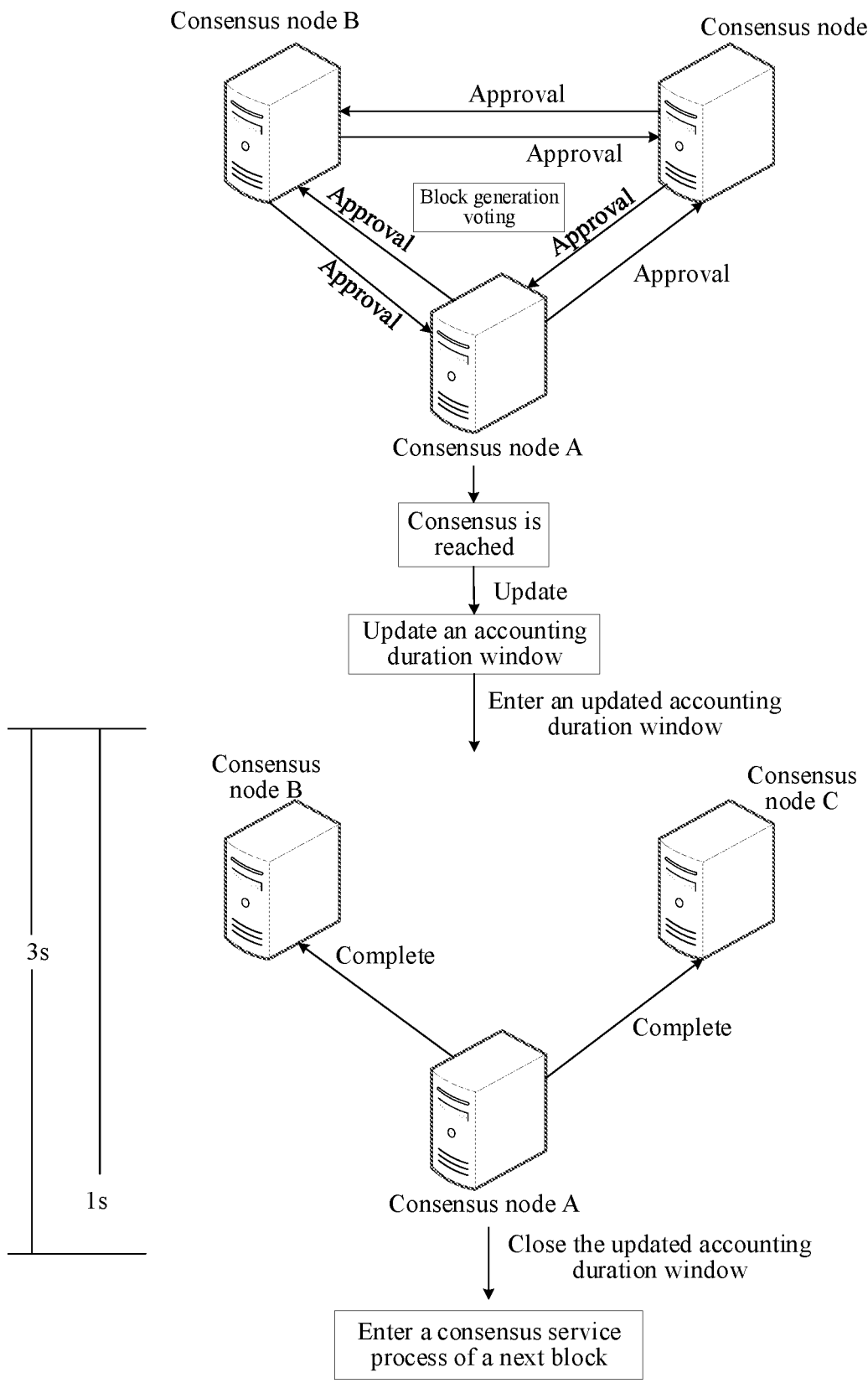
FIG. 6 is a schematic diagram of an accounting scenario according to an embodiment of this application.

FIG. 6 is a schematic diagram of an accounting scenario according to an embodiment of this application. As shown in FIG. 6, a consensus node A may be a block generation node and the consensus node A may be a first node. When block generation voting is performed on a target block, the consensus node A receives voting information of other consensus nodes (for example, a consensus node B and a consensus node C in FIG. 6). Both the consensus node B and the consensus node C may be second nodes. The consensus node B and the consensus node C quickly transmit the voting information, the voting information of the consensus node B is approval, and the voting information of the consensus node C is also approval. Because a quantity 3 of approval votes is equal to a total quantity 3 of nodes in a blockchain network, the consensus node A may determine that a consensus result for the target block is that a consensus is reached. Because the consensus node receives all the voting information (the voting information of the consensus node B and the consensus node C) in the blockchain network, the consensus node A may obtain a performance parameter of the consensus node B carried in the voting information transmitted by the consensus node B and a performance parameter of the consensus node C carried in the voting information transmitted by the consensus node C, and the consensus node A may update the accounting duration window with the duration threshold of 6 s according to the performance parameters of the consensus node B and the consensus node C, so that a duration threshold of an updated accounting duration window is changed into 3 s. The consensus node A, the consensus node B, and the consensus node C may enter the updated accounting duration window and perform accounting processing on the target block. The consensus node A, the consensus node B, and the consensus node C need to perform accounting processing on the target block within 3 s, and if accounting processing on the target block is completed within 3 s after the updated accounting duration window is entered, the updated accounting duration window may be closed and a consensus service process of a next block is entered. If accounting processing on the target block is not completed within 3 s after the updated accounting duration window is entered, the updated accounting duration window may be closed when 3 s is reached, and the consensus service process of the next block is entered. As shown in FIG. 6, the consensus node A completes accounting processing on the target block at 1 s after entering the updated accounting duration window, and the consensus node A performs broadcasting for notification. Both the consensus node B and the consensus node C receive an accounting completion message of the consensus node A. When completing accounting, that is, at 1 s, the consensus node A may close the updated accounting duration window and enter the consensus service process of the next block. Certainly, when completing block accounting at 1 s, the consensus node A may alternatively choose to not perform broadcasting for notification. That is, after completing block accounting, without transmitting the accounting completion message to the consensus node B and the consensus node C, the consensus node A directly closes the updated accounting duration window and enters the consensus service process of the next block.

It may be understood that in the updated accounting duration window, when the consensus node A completes block accounting at 1 s, the consensus node A may transmit the accounting completion message to the consensus node B and the consensus node C and does not close the updated accounting duration window. The consensus node A may wait for the consensus node B and the consensus node C to perform accounting in the updated accounting duration window, and close the updated accounting duration window when determining that 2/3 of consensus nodes complete block accounting and enter the consensus service process of the next block. For example, the consensus node B completes block accounting at 1.5 s and performs broadcasting for notification, and the consensus node A receives an accounting completion message of the consensus node B. In this case, the consensus node A may determine that two consensus nodes (the consensus node A and the consensus node B) have completed block accounting, and a ratio of a quantity (2) of nodes that have completed accounting to a total quantity (3) of nodes in the blockchain network is 2/3, which reaches a given ratio 2/3, so that the consensus node A may close the updated accounting duration window at 1.5 s and enter the consensus service process of the next block.

That is, when block generation voting is performed, and if voting information of all consensus nodes is broadcasted quickly (a network status of each consensus node is good, and voting results are quickly broadcasted), and in the voting information, voting information of consensus nodes exceeding a ratio threshold is all approval votes, in this case, each consensus node may update the accounting duration window according to performance parameters of other consensus node (the duration threshold of the accounting duration window is reduced), perform block accounting in an updated accounting duration window, and enter a subsequent consensus process after completing block accounting. Because statuses of the consensus nodes are all good and are not much different, accounting speeds may also be basically kept consistent. When a subsequent consensus process is entered, stored blocks may also be basically kept consistent. In this case, the duration threshold of the accounting duration window is reduced, so that the consensus node may not need to wait for other consensus nodes or a waiting duration may be reduced, and the consensus node may quickly enter the subsequent consensus service process and the stored blocks may also be basically kept consistent.

Figure 7:
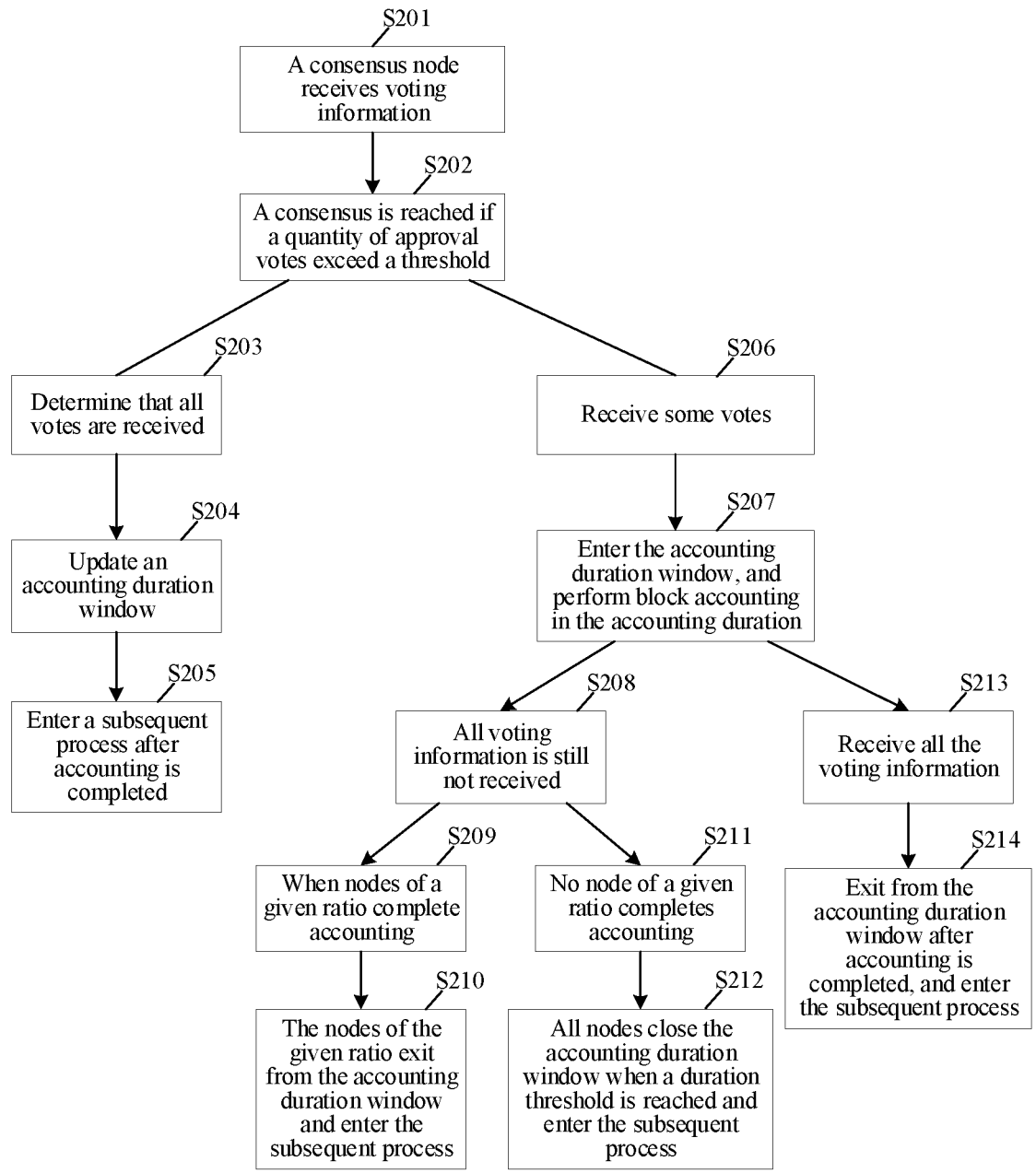
FIG. 7 is a schematic flowchart of a blockchain-based data processing method according to an embodiment of this application.

Further, FIG. 7 is a schematic flowchart of a blockchain-based data processing method according to an embodiment of this application. As shown in FIG. 7, a procedure of this solution may be as follows.

Step S201. A consensus node receives voting information for a target block.

Specifically, before performing accounting on a block, a consensus node in a blockchain network needs to perform block generation voting on the block. When voting results of consensus nodes exceeding a threshold received by the consensus node are all approval, the consensus node determines that a consensus is reached on the block, and after the consensus is reached, the consensus node performs block accounting.

Step S202. The consensus node determines that a consensus is reached on the target block.

Specifically, when the consensus node performs the block generation voting, because the consensus nodes transmit messages at different speeds, voting information of other consensus nodes is received by each consensus node at different moments. When the consensus node counts that a quantity of approval votes in the received voting information exceeds a threshold, the consensus node determines that the consensus has been reached on the block on which the voting is performed.

Step S203. The consensus node determines that all votes are received.

Specifically, if all the consensus nodes have good states and transmit voting information quickly, and when counting that the quantity of approval votes exceeds the threshold, each consensus node may have received the voting information of all the consensus nodes.

Step S204. The consensus node updates an accounting duration window when receiving all the votes.

If each consensus node in the blockchain network is in a good state and quickly transmits the voting information, and when counting that the quantity of approval votes exceeds the threshold, each consensus node has received the voting information of all the consensus nodes. In the blockchain network, because each consensus node is in the good state, and accounting speeds are not much different, blocks stored in the consensus nodes are not much different, and a consensus success rate in a subsequent consensus process is also high. In this case, the consensus node may update an accounting duration window according to performance parameters of other consensus nodes and reduce a duration threshold of the accounting duration window, to obtain an updated accounting duration window, and perform block accounting in the updated accounting duration window.

Step S205. The consensus node enters a subsequent process after completing accounting.

Specifically, after completing block accounting in the updated accounting duration window, the consensus node may enter a subsequent process, for example, enter a consensus service process of a next block of the target block. If block accounting is not completed in the updated accounting duration window, and when a duration threshold of the updated accounting duration window is reached, the updated accounting duration window is closed, and the subsequent process is entered.

Step S206. The consensus node determines that some votes are received.

Specifically, because some consensus nodes have a low transmitting speed, although some consensus nodes have not received the voting information of all the consensus nodes, the consensus node has counted that the quantity of approval votes has exceeded the threshold.

Step S207. The consensus node enters the accounting duration window.

Specifically, in the blockchain network, because some consensus nodes are in a relatively poor state and have a relatively low accounting speed, if the consensus nodes with a high accounting speed do not wait for the consensus nodes with a low accounting speed, blocks stored in the consensus nodes with the low accounting speed are greatly different from blocks stored in the consensus nodes with the high accounting speed, to affect a consensus success rate of the subsequent consensus process. In this case, the consensus node may enter the accounting duration window without updating the accounting duration window, and perform block accounting in the accounting duration window. The accounting duration window may be understood as a waiting duration set for the consensus node, so that after completing accounting, the consensus node with the high accounting speed may wait for the consensus node with the low accounting speed.

Step S208. The consensus node still does not receive all the votes in the accounting duration window.

Specifically, when performing block accounting in the accounting duration window, the consensus node may still continue to receive voting information of other consensus nodes. Because some consensus nodes have a low transmitting speed, in the accounting duration window, the consensus nodes with the low transmitting speed have not transmitted voting information, or some consensus nodes with the low transmitting speed have transmitted voting information, but a small quantity of consensus nodes still have not transmitted voting information. That is, the consensus node has not received all the votes all the time in the accounting duration window.

Step S209. The consensus node completes accounting in the accounting duration window.

Specifically, when the consensus node has not received all the votes all the time, when completing block accounting in the accounting duration window, the consensus node performs broadcasting for notification in the accounting duration window, needs to wait for other consensus nodes to perform accounting, and receives notification messages of other nodes that have completed accounting until a ratio of the number of nodes that have completed accounting to the total quantity of nodes reaches or exceeds a given ratio.

Step S210. The consensus node exits from the accounting duration window.

Specifically, when consensus nodes exceeding or reaching the given ratio (for example, 2/3) all complete accounting, the consensus nodes that have completed block accounting may exit from the accounting duration window and enter the subsequent process. In addition, if the consensus nodes that have completed block accounting do not exceed or reach the given ratio, when the duration threshold of the accounting duration window is reached, the consensus nodes that have completed block accounting and the consensus nodes that have not completed block accounting close the accounting duration window and enter the subsequent process together.

Step S211. The consensus node keeps waiting if no consensus node of a given ratio completes accounting.

Step S212. All nodes close (e.g., deactivate) the accounting duration window when a duration threshold of the accounting duration window is reached and enter a subsequent process.

Step S213. The consensus node receives all the votes in the accounting duration window.

Specifically, when the consensus node performs block accounting in the accounting duration window, all the consensus nodes with the low transmitting speed transmit the voting information (that is, the voting information of all the consensus nodes is received in the accounting duration window), and it may be understood as that the consensus node receives all the votes.

Step S214. The consensus node exits from the accounting duration window after completing accounting.

Specifically, when receiving all the votes in the accounting duration window, the consensus node continues to perform block accounting in the accounting duration window, directly exits from the accounting duration window after completing accounting, and enters the subsequent process (because the voting information of all the consensus nodes is successfully received in the accounting duration window, statuses of the consensus nodes are similar, accounting speeds and network statuses are not much different, accounting may be completed within a similar time, and stored blocks are also not much different in a subsequent process, so that there is no need to wait).

Figure 8:
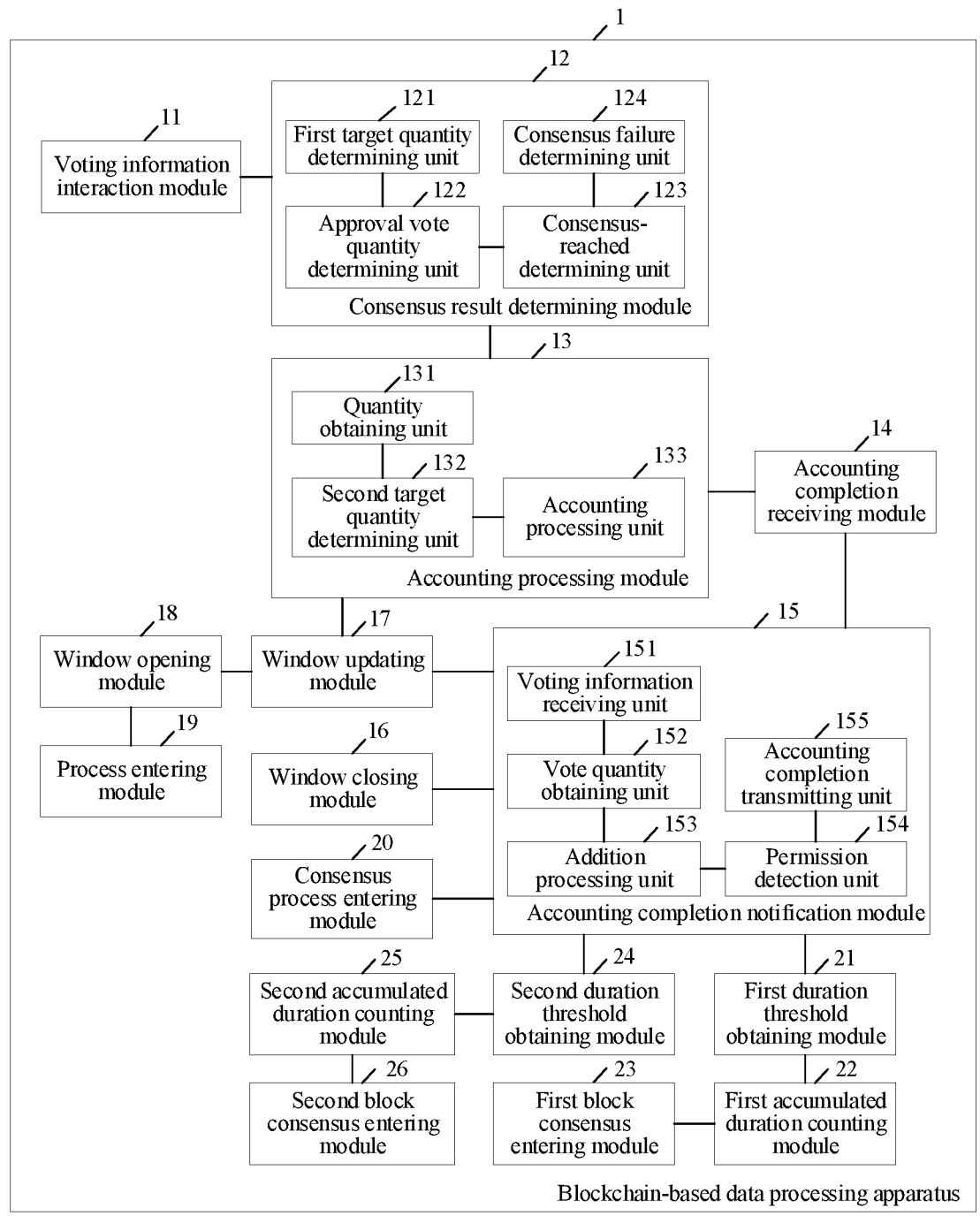
FIG. 8 is a schematic structural diagram of a blockchain-based data processing apparatus according to an embodiment of this application.

Further, FIG. 8 is a schematic structural diagram of a blockchain-based data processing apparatus according to an embodiment of this application. The blockchain-based data processing apparatus may be a computer-readable instruction (including program code) run on a computer device. For example, the blockchain-based data processing apparatus is application software. The apparatus may be configured to perform corresponding steps in the method provided in the embodiments of this application. The data processing apparatus 1 may include: a voting information interaction module 11, a consensus result determining module 12, an accounting processing module 13, an accounting completion receiving module 14, an accounting completion notification module 15, and a window closing module 16.

The voting information interaction module 11 is configured to transmit first consensus voting information for a target block to a second node, and receive second consensus voting information for the target block transmitted by the second node.

The consensus result determining module 12 is configured to determine a consensus result for the target block according to the first consensus voting information and the second consensus voting information.

The accounting processing module 13 is configured to open an accounting duration window in accordance with a determination that the consensus result is a consensus success result, and perform accounting processing on the target block in the accounting duration window.

The accounting completion receiving module 14 is configured to receive, in the accounting duration window, a first accounting completion message for the target block transmitted by the second node.

The accounting completion notification module 15 is configured to transmit a second accounting completion message to the second node in accordance with a determination that accounting processing on the target block is completed in the accounting duration window.

The window closing module 16 is configured to close the accounting duration window in accordance with a determination that a sum of total quantities of first accounting completion messages and second accounting completion messages is greater than or equal to a quantity threshold, and enter a consensus service process of a subsequent block of the target block.

For specific implementations of the voting information interaction module 11, the consensus result determining module 12, the accounting processing module 13, the accounting completion receiving module 14, the accounting completion notification module 15, and the window closing module 16, reference may be made to the descriptions of step S101 to step S104 in the embodiment corresponding to FIG. 2. Details are not described herein again.

Referring to FIG. 8, the consensus result determining module 12 may include: a first target quantity determining unit 121, an approval vote quantity determining unit 122, a consensus-reached determining unit 123, and a consensus failure determining unit 124.

The first target quantity determining unit 121 is configured to determine, in the second consensus voting information, a quantity of pieces of second consensus voting information being approval votes as a first target quantity.

The approval vote quantity determining unit 122 is configured to determine a total quantity of approval votes according to the first consensus voting information and the first target quantity in accordance with a determination that the first consensus voting information is the approval vote, and determine the total quantity of approval votes according to the first target quantity in accordance with a determination that the first consensus voting information is a consensus-reached rejecting vote.

The consensus-reached determining unit 123 is configured to determine, in accordance with a determination that a ratio of the total quantity of approval votes to a total quantity of nodes is greater than or equal to a ratio threshold, the consensus result for the target block as the consensus success result, the total quantity of nodes being total quantities of first nodes and second nodes.

The consensus failure determining unit 124 is configured to determine, in accordance with a determination that the ratio of the total quantity of approval votes to the total quantity of nodes is less than the ratio threshold, the consensus result for the target block as a consensus failure result.

For specific implementations of the first target quantity determining unit 121, the approval vote quantity determining unit 122, the consensus-reached determining unit 123, and the consensus failure determining unit 124, reference may be made to the description in step S102 in the embodiment corresponding to FIG. 2. Details are not described herein again.

Referring to FIG. 8, the accounting processing module 13 may include: a quantity obtaining unit 131, a second target quantity determining unit 132, and an accounting processing unit 133.

The quantity obtaining unit 131 is configured to obtain a quantity of pieces of second consensus voting information in accordance with a determination that the consensus result is the consensus success result.

The second target quantity determining unit 132 is configured to obtain a quantity of second nodes as a second target quantity.

The accounting processing unit 133 is configured to open the accounting duration window in accordance with a determination that the quantity of pieces of second consensus voting information is less than the second target quantity, and perform accounting processing on the target block in the accounting duration window.

For specific implementations of the quantity obtaining unit 131, the second target quantity determining unit 132, and the accounting processing unit 133, reference may be made to the description in step S102 in the embodiment corresponding to FIG. 2, and details are not described herein again.

Referring to FIG. 8, the data processing apparatus 1 may include the voting information interaction module 11, the consensus result determining module 12, the accounting processing module 13, the accounting completion receiving module 14, the accounting completion notification module 15, and the window closing module 16, and may further include: a window updating module 17, a window opening module 18, and a process entering module 19.

The window updating module 17 is configured to update the accounting duration window according to a performance parameter of the second node in accordance with a determination that the quantity of pieces of second consensus voting information is equal to the second target quantity, to obtain an updated accounting duration window, a duration threshold corresponding to the updated accounting duration window being less than a duration threshold corresponding to the accounting duration window.

The window opening module 18 is configured to open the updated accounting duration window, and perform accounting processing on the target block in the updated accounting duration window.

The process entering module 19 is configured to enter the consensus service process of the subsequent block of the target block in accordance with a determination that accounting processing on the target block is completed by the first node in the updated accounting duration window.

For specific implementations of the window updating module 17, the window opening module 18, and the process entering module 19, reference may be made to the description in step S104 in the embodiment corresponding to FIG. 2. Details are not described herein again.

Referring to FIG. 8, the accounting completion notification module 15 may include: a voting information receiving unit 151, a vote quantity obtaining unit 152, an addition processing unit 153, a permission detection unit 154, and an accounting completion transmitting unit 155.

The voting information receiving unit 151 is configured to receive, in the accounting duration window, third consensus voting information for the target block transmitted by remaining second nodes, the remaining second nodes being nodes in the plurality of second nodes other than the second node that has transmitted the second consensus voting information.

The vote quantity obtaining unit 152 is configured to obtain a total quantity of pieces of third consensus voting information in accordance with a determination that accounting processing on the target block is completed in the accounting duration window.

The addition processing unit 153 is configured to add the quantity of pieces of third consensus voting information to the quantity of pieces of second consensus voting information, to obtain a total quantity of consensus votes.

The permission detection unit 154 is configured to detect a message transmitting permission of the first node according to the total quantity of consensus votes and the second target quantity.

The accounting completion transmitting unit 154 is configured to transmit the second accounting completion message to the second node in accordance with a determination that the first node has the message transmitting permission.

For specific implementations of the voting information receiving unit 151, the vote quantity obtaining unit 152, the addition processing unit 153, the permission detection unit 154, and the accounting completion transmitting unit 155, reference may be made to the description in step S103 in the embodiment corresponding to FIG. 2. Details are not described herein again.

Referring to FIG. 8, the permission detection unit 154 may include: a first permission determining subunit 1541 and a second permission determining subunit 1542.

The first permission determining subunit 1541 is configured to determine that the first node has the message transmitting permission in accordance with a determination that the total quantity of consensus votes is less than the second target quantity.

The second permission determining subunit 1542 is configured to determine that the first node has no message transmitting permission in accordance with a determination that the total quantity of consensus votes is equal to the second target quantity.

For specific implementations of the first permission determining subunit 1541 and the second permission determining subunit 1542, reference may be made to the description in step S103 in the embodiment corresponding to FIG. 2. Details are not described herein again.

Referring to FIG. 8, the data processing apparatus 1 may include the voting information interaction module 11, the consensus result determining module 12, the accounting processing module 13, the accounting completion receiving module 14, the accounting completion notification module 15, the window closing module 16, the window updating module 17, the window opening module 18, and the process entering module 19, and may further include: a consensus process entering module 20.

The consensus process entering module 20 is configured to close the accounting duration window in accordance with a determination that the first node has no message transmitting permission, and enter the consensus service process of the subsequent block of the target block.

For a specific implementation of the consensus process entering module 20, reference may be made to the description in step S104 in the embodiment corresponding to FIG. 2. Details are not described herein again.

Referring to FIG. 8, the data processing apparatus 1 may include the voting information interaction module 11, the consensus result determining module 12, the accounting processing module 13, the accounting completion receiving module 14, the accounting completion notification module 15, the window closing module 16, the window updating module 17, the window opening module 18, the process entering module 19, and the consensus process entering module 20, and may further include: a first duration threshold obtaining module 21, a first accumulated duration counting module 22, and a first block consensus entering module 23.

The first duration threshold obtaining module 21 is configured to obtain a duration threshold corresponding to the accounting duration window.

The first accumulated duration counting module 22 is configured to count an accumulated duration over which the first node is in the accounting duration window.

The first block consensus entering module 23 is configured to close the accounting duration window in accordance with a determination that the accumulated duration is equal to the duration threshold and the sum of the total quantities of first accounting completion messages and second accounting completion messages is less than the quantity threshold, and enter the consensus service process of the subsequent block of the target block.

For specific implementations of the first duration threshold obtaining module 21, the first accumulated duration counting module 22, and the first block consensus entering module 23, reference may be made to the description in step S104 in the embodiment corresponding to FIG. 2. Details are not described herein again.

Referring to FIG. 8, the data processing apparatus 1 may include the voting information interaction module 11, the consensus result determining module 12, the accounting processing module 13, the accounting completion receiving module 14, the accounting completion notification module 15, the window closing module 16, the window updating module 17, the window opening module 18, the process entering module 19, the consensus process entering module 20, the first duration threshold obtaining module 21, the first accumulated duration counting module 22, and the first block consensus entering module 23, and may further include: a second duration threshold obtaining module 24, a second accumulated duration counting module 25, and a second block consensus entering module 26.

The second duration threshold obtaining module 24 is configured to obtain a duration threshold corresponding to the accounting duration window.

The second accumulated duration counting module 25 is configured to obtain an accumulated duration over which the first node is in the accounting duration window.

The second block consensus entering module 26 is configured to close the accounting duration window in accordance with a determination that the accumulated duration is equal to the duration threshold and accounting processing on the target block is not completed by the first node in the accounting duration window, and enter the consensus service process of the subsequent block of the target block.

For specific implementations of the second duration threshold obtaining module 24, the second accumulated duration counting module 25, and the second block consensus entering module 26, reference may be made to the description in step S104 in the embodiment corresponding to FIG. 2. Details are not described herein again.

In this embodiment of this application, after a consensus is reached on a block and when block accounting is performed, by adding an accounting duration window for consensus nodes, the consensus nodes (for example, a first node and a second node) perform accounting in the accounting duration window, and each consensus node may perform broadcasting for notification after completing accounting. Among the consensus nodes that perform accounting, when all consensus nodes of which a quantity exceeds a quantity threshold complete block accounting, the consensus nodes that have completed accounting close the accounting duration window and enter a consensus process of a next block. In this way, the consensus nodes that first complete block accounting may wait for other consensus nodes to complete block accounting in the accounting duration window and then enter the consensus process of the next block together. It can be learned that in the accounting duration window, because consensus nodes with a fast speed wait for consensus nodes with a relatively slow speed to perform accounting, the consensus nodes that enter a consensus process of a next block together may store blocks that are the same or have a small difference, that is, block heights of the consensus nodes are the same or have a small difference. The consensus node may synchronize the block heights with the small difference as the same through block synchronization within a short period of time. In this way, when a consensus is reached on a next block, consensus failure of the consensus node caused by inconsistent block heights may be reduced, so that a consensus success rate of a consensus service process can be improved.

Figure 9:
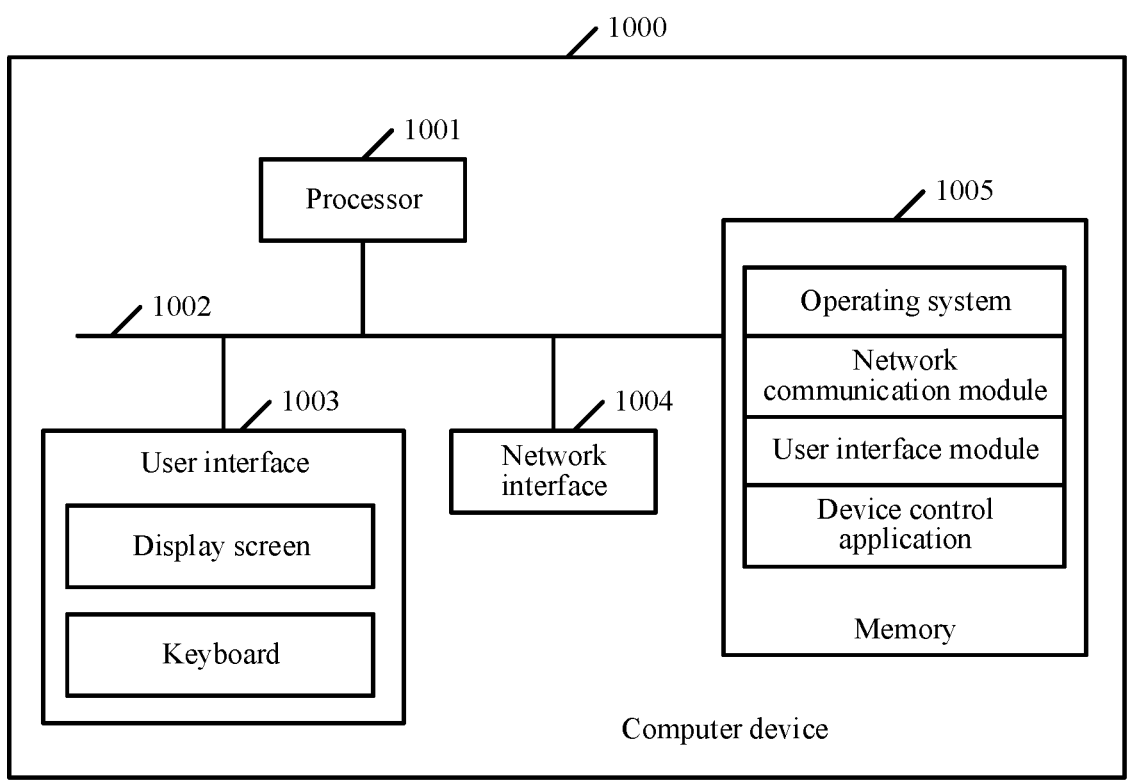
FIG. 9 is a schematic diagram of a computer device according to an embodiment of this application.

Further, FIG. 9 is a schematic structural diagram of a computer device according to an embodiment of this application. As shown in FIG. 9, the apparatus 1 in the embodiment corresponding to FIG. 8 is applicable to the computer device 1000. The computer device 1000 may include at least one processor 1001 such as a CPU, at least one network interface 1004, a user interface 1003, a memory 1005, and at least one communication bus 1002. The communication bus 1002 is configured to implement connection and communication between the components. The user interface 1003 may include a display and a keyboard. In some embodiments, the network interface 1004 may include a standard wired interface and a standard wireless interface (for example, a WI-FI interface). The memory 1005 may be a high-speed RAM memory, or may be a non-volatile memory, for example, at least one magnetic disk memory. In some embodiments, the memory 1005 may be at least one storage apparatus located remotely from the foregoing processor 1001. As shown in FIG. 9, the memory 1005 used as a computer storage medium may include an operating system, a network communication module, a user interface module, and a device-control application program.

In the computer device 1000 shown in FIG. 9, the network interface 1004 is mainly configured to perform network communication with a service server. The user interface 1003 is mainly configured to provide an input interface for a user. The processor 1001 may be configured to invoke a device control application stored in the memory 1005, to implement:

transmitting first consensus voting information for a target block to a second node, and receiving second consensus voting information for the target block transmitted by the second node;

determining a consensus result for the target block according to the first consensus voting information and the second consensus voting information, opening an accounting duration window in accordance with a determination that the consensus result is a consensus success result, performing accounting processing on the target block in the accounting duration window, and receiving a first accounting completion message for the target block transmitted by the second node in the accounting duration window;

transmitting a second accounting completion message to the second node in accordance with a determination that accounting processing target block is completed in the accounting duration window; and closing the accounting duration window in accordance with a determination that a sum of total quantities of first accounting completion messages and second accounting completion messages is greater than or equal to a or equal quantity threshold, and entering a consensus service process of a subsequent block of the target block.

It is to be understood that the computer device 1000 described in this embodiment of this application can implement the descriptions of the blockchain-based data processing method in the foregoing embodiments corresponding to FIG. 2 to FIG. 7, and can also implement the descriptions of the data processing apparatus 1 in the foregoing embodiment corresponding to FIG. 8. Details are not described herein again. In addition, the description of beneficial effects of the same method are not described herein again.

In addition, an embodiment of this application further provides a computer-readable storage medium. The computer-readable storage medium stores a computer program executed by the computer device 1000. The computer program includes computer-readable instructions. When executing the computer-readable instruction, the processor can implement the descriptions of the blockchain-based data processing method in the embodiments corresponding to FIG. 2 to FIG. 7. Therefore, details are not described herein again. In addition, the description of beneficial effects of the same method are not described herein again. For technical details that are not disclosed in the embodiments of the computer-readable storage medium of this application, refer to the method embodiments of this application.

In an embodiment, a computer device is further provided, including a memory and one or more processors, the memory storing computer-readable instructions, the one or more processor, when executing the computer-readable instructions, implementing the steps in the foregoing method embodiments.

In an embodiment, one or more non-volatile computer-readable storage media storing computer-readable instructions are provided, storing the computer-readable instructions, the computer-readable instructions, when executed by one or more processors, implementing the steps in the foregoing method embodiments.

In an embodiment, a computer program product or a computer program is provided, the computer program product or the computer program including computer-readable instructions, the computer-readable instructions being stored in a computer-readable storage medium, a processor of a computer device reading the computer-readable instructions from the computer-readable storage medium, and the processor executing the computer-readable instructions to cause the computer device to perform the steps in the foregoing method embodiments.

The computer-readable storage medium may be the blockchain-based data processing apparatus provided in any of the foregoing embodiments or an internal storage unit of the computer device, for example, a hard disk or an internal memory of the computer device. The computer-readable storage medium may also be an external storage device of the computer device, such as a plug-in hard disk, a smart media card (SMC), a secure digital (SD) card, or a flash card that is equipped on the computer device. Further, the computer-readable storage medium may also include an internal storage unit of the computer device and an external storage device. The computer-readable storage medium is used for storing the computer-readable instructions and another program and data required by the computer device. The computer-readable storage medium may be further used for temporarily storing data that has been output or will be output.

In the specification, claims, and accompanying drawings of the embodiments of this application, the terms "first", "second", and the like are intended to distinguish between different objects but do not indicate a particular order. In addition, the terms "include" and any variant thereof are intended to cover a non-exclusive inclusion. For example, a process, method, apparatus, product, or device that includes a series of steps or units is not limited to the listed steps or modules, but further includes a step or a module that is not listed, or in some embodiments, includes another step unit that is intrinsic to the process, method, apparatus, product, or device.

A person of ordinary skill in the art may be aware that, the units and steps in the examples described with reference to the embodiments disclosed herein can be implemented by electronic hardware, computer software, or a combination thereof. To clearly describe the interchangeability between the hardware and the software, the foregoing has usually described compositions and steps of each example according to functions. Whether the functions are executed in a mode of hardware or software depends on particular applications and design constraint conditions of the technical solutions. A person skilled in the art may use different methods to implement the described functions for each particular application, but it not to be considered that the implementation goes beyond the scope of this application.

The method and related apparatus provided in the embodiments of this application are described with reference to the method flowchart and/or the schematic structural diagram provided in the embodiments of this application. Specifically, the computer readable instructions implement each process and/or each block in the method flowchart and/or the schematic structural diagram and a combination of a process and/or a block in the flowchart and the block diagram. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What is disclosed above is merely exemplary embodiments of this application, and certainly is not intended to limit the scope of the claims of this application. Therefore, equivalent variations made in accordance with the claims of this application shall fall within the scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs consensus voting information processing and/or accounting. In practical application, the foregoing functions may be allocated to and completed by different functional modules according to requirements, that is, an inner structure of a device is divided into different functional modules to implement all or a part of the functions described above.

What is claimed is:

1. A blockchain-based data processing method, performed by a first node, the first node being a computer device, the method comprising:
   transmitting, to a second node, first consensus voting information for a target block in a blockchain;
   receiving, from the second node, second consensus voting information for the target block of blockchain;
   determining, by one or more processors, a consensus result for the target block of the blockchain according to the first consensus voting information and the second consensus voting information;
   in accordance with a determination that the consensus result is a consensus success result, activating, by the one or more processors, an accounting duration window having a predetermined time duration, wherein the activating the accounting duration window comprises:
      obtaining a quantity of approval votes according to the second consensus voting information;
      obtaining a quantity of second nodes as a second target quantity; and
      in accordance with a determination that a ratio of the quantity of approval votes is less than the second target quantity:
         opening the accounting duration window; and
         performing accounting processing on the target block of the blockchain in the predetermined time duration of the accounting duration window;
   receiving, from the second node, a first accounting completion messages for the target block of the blockchain in the predetermined time duration of the accounting duration window;
   in accordance with a determination that accounting processing on the target block of the blockchain is completed in the accounting duration window, transmitting, by the processor, second accounting completion messages to the second node; and
   in accordance with a determination that a sum of total quantities of the first accounting completion messages and the second accounting completion messages is greater than or equal to a quantity threshold:
      closing, by the one or more processors, the accounting duration window; and
      entering, by the one or more processors, a consensus service process of a subsequent block of the target block of blockchain.

2. The method according to claim 1, wherein determining the consensus result for the target block according to the first consensus voting information and the second consensus voting information comprises:
   determining, according to the second consensus voting information, a quantity of second consensus voting information corresponding to approval votes as a first target number;
   in accordance with a determination that the first consensus voting information corresponds to an approval vote, determining a total quantity of approval votes according to the first consensus voting information and the first target quantity;
   in accordance with a determination that a ratio of the total quantity of approval votes to a total quantity of nodes is at least equal to a ratio threshold, determining the consensus result for the target block as the consensus success result; and
   in accordance with a determination that the ratio of the total quantity of approval votes to the total quantity of nodes is less than the ratio threshold, determining, the consensus result for the target block as a consensus failure result.

3. The method according to claim 2, further comprising:
in accordance with a determination that the first consensus voting information corresponds to a consensus-reached rejecting vote, determining the total quantity of approval votes according to the first target quantity.

4. The method according to claim 1, wherein activating the accounting duration window comprises:
- in accordance with a determination that the consensus result is the consensus success result, obtaining a quantity of approval votes according to the second consensus voting information;
- obtaining a quantity of second nodes as a second target quantity; and
- in accordance with a determination that the quantity of approval votes is less than the second target quantity: opening the accounting duration window; and performing accounting processing on the target block in the accounting duration window.

5. The method according to claim 4, wherein the second consensus voting information carries a performance parameter of the second node; and the method further comprises:
- in accordance with a determination that the quantity of approval votes is equal to the second target quantity:
- updating the accounting duration window according to the performance parameter of the second node, to obtain an updated accounting duration window, wherein a duration threshold corresponding to the updated accounting duration window is less than a duration threshold corresponding to the accounting duration window;
- opening the updated accounting duration window, and performing accounting processing on the target block in the updated accounting duration window; and
- in accordance with a determination that accounting processing on the target block is completed within the updated accounting duration window entering the consensus service process of the subsequent block of the target block.

6. The method according to claim 4, wherein: the second node is one of a plurality of second nodes; and transmitting the second accounting completion message to the second node comprises:
- receiving, in the predetermined time duration of the accounting duration window, third consensus voting information for the target block transmitted by other second nodes of the plurality of second nodes, the other second nodes are nodes in the plurality of second nodes other than the second node that has transmitted the second consensus voting information;
- in accordance with a determination that accounting processing on the target block is completed in the accounting duration window, obtaining a quantity of approval votes corresponding to the third consensus voting information;
- adding the quantity of approval votes corresponding to the third consensus voting information to a number of approval votes corresponding to the second consensus voting information, to obtain a total quantity of consensus votes; detecting a message transmitting permission of the first node according to the total quantity of consensus votes and the second target quantity; and
- in accordance with a determination that the first node has the message transmitting permission, transmitting the second accounting completion message to the second node.

7. The method according to claim 6, wherein detecting the message transmitting permission comprises:
- in accordance with a determination that the total quantity of consensus votes is less than the second target quantity, determining that the first node has the message transmitting permission; and
- in accordance with a determination that the total quantity of consensus votes is equal to the second target quantity, determining that the first node has no message transmitting permission.

8. The method according to claim 6, further comprising: closing the accounting duration window in accordance with a determination that the first node has no message transmitting permission, and entering the consensus service process of the subsequent block of the target block.

9. The method according to claim 1, further comprising:
- obtaining a duration threshold corresponding to the accounting duration window; counting an accumulated duration over which the first node is in the accounting duration window; and
- closing the accounting duration window in accordance with a determination that the accumulated duration is equal to the duration threshold and a total quantity of first accounting completion messages and second accounting completion messages is less than the quantity threshold, and entering the consensus service process of the subsequent block of the target block.

10. The method according to claim 1, further comprising: obtaining a duration threshold corresponding to the accounting duration window; obtaining an accumulated duration over which the first node is in the accounting duration window; and closing the accounting duration window in accordance with a determination that the accumulated duration is equal to the duration threshold and accounting processing on the target block is not completed by the first node in the accounting duration window, and entering the consensus service process of the subsequent block of the target block.

11. A computer device, corresponding to a first node, the computer device comprising: one or more processors; and memory storing one or more programs, the one or more programs comprising instructions that, when executed by the one or more processors, cause the one or more processors to perform operations comprising:
- transmitting, to a second node, first consensus voting information for a target block in a blockchain;
- receiving, from the second node, second consensus voting information for the target block of blockchain;
- determining a consensus result for the target block of blockchain according to the first consensus voting information and the second consensus voting information;
- in accordance with a determination that the consensus result is a consensus success result, activating an accounting duration window having a predetermined time duration, wherein the activating the accounting duration window comprises:
  - obtaining a quantity of approval votes according to the second consensus voting information;
  - obtaining a quantity of second nodes as a second target quantity; and
  - in accordance with a determination that a ratio of the quantity of approval votes is less than the second target quantity:
    - opening the accounting duration window; and
    - performing accounting processing on the target block of blockchain in the predetermined time duration of the accounting duration window;
- receiving, from the second node, a first accounting completion messages for the target block of the blockchain in the predetermined time duration of the accounting duration window;

in accordance with a determination that accounting processing on the target block of the blockchain is completed in the accounting duration window, transmitting a second accounting completion messages to the second node; and in accordance with a determination that a sum of total quantities of the first accounting completion messages and the second accounting completion messages is greater than or equal to a quantity threshold:

closing the accounting duration window; and entering a consensus service process of a subsequent block of the target block of blockchain.

12. The computer device according to claim 11, wherein determining the consensus result for the target block according to the first consensus voting information and the second consensus voting information comprises:

determining, according to the second consensus voting information, a quantity of second consensus voting information corresponding to approval votes as a first target number;

in accordance with a determination that the first consensus voting information corresponds to an approval vote, determining a total quantity of approval votes according to the first consensus voting information and the first target quantity;

in accordance with a determination that a ratio of the total quantity of approval votes to a total quantity of nodes is at least equal to a ratio threshold, determining the consensus result for the target block as the consensus success result; and in accordance with a determination that the ratio of the total quantity of approval votes to the total quantity of nodes is less than the ratio threshold, determining, the consensus result for the target block as a consensus failure result.

13. The computer device according to claim 12, the operations further comprising: in accordance with a determination that the first consensus voting information corresponds to a consensus-reached rejecting vote, determining the total quantity of approval votes according to the first target quantity.

14. The computer device according to claim 1, wherein the second consensus voting information carries a performance parameter of the second node; and the operations further comprise:

in accordance with a determination that the quantity of approval votes is equal to the second target quantity:

updating the accounting duration window according to the performance parameter of the second node, to obtain an updated accounting duration window, wherein a duration threshold corresponding to the updated accounting duration window is less than a duration threshold corresponding to the accounting duration window;

opening the updated accounting duration window, and performing accounting processing on the target block in the updated accounting duration window; and in accordance with a determination that accounting processing on the target block is completed within the updated accounting duration window entering the consensus service process of the subsequent block of the target block.

15. The computer device according to claim 1, wherein: the second node is one of a plurality of second nodes; and transmitting the second accounting completion message to the second node comprises:

receiving, in the predetermined time duration of the accounting duration window, third consensus voting information for the target block transmitted by other second nodes of the plurality of second nodes, the other second nodes are nodes in the plurality of second nodes other than the second node that has transmitted the second consensus voting information;

in accordance with a determination that accounting processing on the target block is completed in the accounting duration window, obtaining a quantity of approval votes corresponding to the third consensus voting information;

adding the quantity of approval votes corresponding to the third consensus voting information to a number of approval votes corresponding to the second consensus voting information, to obtain a total quantity of consensus votes;

detecting a message transmitting permission of the first node according to the total quantity of consensus votes and the second target quantity; and in accordance with a determination that the first node has the message transmitting permission, transmitting the second accounting completion message to the second node.

16. The computer device according to claim 15, wherein detecting the message transmitting permission comprises:

in accordance with a determination that the total quantity of consensus votes is less than the second target quantity, determining that the first node has the message transmitting permission; and in accordance with a determination that the total quantity of consensus votes is equal to the second target quantity, determining that the first node has no message transmitting permission.

17. A non-transitory computer-readable storage medium, storing a computer program, the computer program, when executed by one or more processors of a computer device corresponding to a first node, cause the one or more processors to perform operations comprising:

transmitting, to a second node, first consensus voting information for a target block in a blockchain;

receiving, from the second node, second consensus voting information for the target block of blockchain;

determining a consensus result for the target block of blockchain according to the first consensus voting information and the second consensus voting information;

in accordance with a determination that the consensus result is a consensus success result, activating an accounting duration window having a predetermined time duration, wherein the activating the accounting duration window comprises:

obtaining a quantity of approval votes according to the second consensus voting information;

obtaining a quantity of second nodes as a second target quantity; and in accordance with a determination that a ratio of the quantity of approval votes is less than the second target quantity:

opening the accounting duration window; and performing accounting processing on the target block of blockchain in the predetermined time duration of the accounting duration window;

receiving, from the second node, a first accounting completion messages for the target block of the blockchain in the predetermined time duration of the accounting duration window;

in accordance with a determination that accounting processing on the target block of the blockchain is completed in the accounting duration window, transmitting a second accounting completion messages to the second node; and in accordance with a determination that a sum of total quantities of the first accounting completion messages and the second accounting completion messages is greater than or equal to a quantity threshold:

closing the accounting duration window; and entering a consensus service process of a subsequent block of the target block of blockchain.

18. The non-transitory computer-readable storage medium according to claim 17, wherein determining the consensus result for the target block according to the first consensus voting information and the second consensus voting information comprises:

determining, according to the second consensus voting information, a quantity of second consensus voting information corresponding to approval votes as a first target number;

in accordance with a determination that the first consensus voting information corresponds to an approval vote, determining a total quantity of approval votes according to the first consensus voting information and the first target quantity;

in accordance with a determination that a ratio of the total quantity of approval votes to a total quantity of nodes is at least equal to a ratio threshold, determining the consensus result for the target block as the consensus success result; and in accordance with a determination that the ratio of the total quantity of approval votes to the total quantity of nodes is less than the ratio threshold, determining, the consensus result for the target block as a consensus failure result.

19. The non-transitory computer-readable storage medium according to claim 18, the operations further comprising: in accordance with a determination that the first consensus voting information corresponds to a consensus-reached rejecting vote, determining the total quantity of approval votes according to the first target quantity.

* * * * *